United States Patent
Nishi et al.

(10) Patent No.: US 6,741,811 B2
(45) Date of Patent: May 25, 2004

(54) OPTICAL CROSS-CONNECT DEVICE AND SYSTEM HAVING THE DEVICE

(75) Inventors: Tetsuya Nishi, Kawasaki (JP); Satoshi Kuroyanagi, Kawasaki (JP); Ichiro Nakajima, Kawasaki (JP); Takuji Maeda, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 09/813,951

(22) Filed: Mar. 22, 2001

(65) Prior Publication Data

US 2002/0063926 A1 May 30, 2002

(30) Foreign Application Priority Data

Nov. 29, 2000 (JP) ........................................ 2000-362142

(51) Int. Cl.7 ................................................ H04J 14/00
(52) U.S. Cl. .............................. 398/50; 398/49; 398/51; 398/47; 385/17; 359/326
(58) Field of Search ............................. 398/50, 56, 48, 398/47, 49, 51; 359/326; 385/17

(56) References Cited

U.S. PATENT DOCUMENTS

| | | | | |
|---|---|---|---|---|
| 5,450,074 A | * | 9/1995 | Yoshifuji | .................... 340/2.22 |
| 5,953,143 A | * | 9/1999 | Sharony et al. | ................ 398/46 |
| 6,496,289 B1 | * | 12/2002 | Kuroyanagi et al. | ........... 398/49 |
| 6,512,612 B1 | * | 1/2003 | Fatehi et al. | ..................... 398/49 |
| 6,522,803 B1 | * | 2/2003 | Nakajima et al. | .............. 385/24 |
| 6,542,268 B1 | * | 4/2003 | Rotolo et al. | ............. 369/44.23 |

FOREIGN PATENT DOCUMENTS

| | | |
|---|---|---|
| JP | 5-130655 | 5/1993 |
| JP | 5-292558 | 11/1993 |
| JP | 6-14046 | 1/1994 |
| JP | 6-85748 | 3/1994 |
| JP | 6-121356 | 4/1994 |
| JP | 6-153248 | 5/1994 |
| JP | 11-146430 | 5/1999 |
| JP | 11-239368 | 8/1999 |

* cited by examiner

*Primary Examiner*—Leslie Pascal
*Assistant Examiner*—Chau M. Nguyen
(74) *Attorney, Agent, or Firm*—Staas & Halsey LLP

(57) ABSTRACT

Disclosed herein is an optical cross-connect device including first wavelength demultiplexing sections each for demultiplexing WDM (wavelength division multiplexed) signal light into a plurality of optical signals, wavelength group generating sections each for receiving the optical signals from each first wavelength demultiplexing section to generate wavelength groups, first wavelength multiplexing sections each for receiving each wavelength group from each wavelength group generating section to output a WDM wavelength group, a routing section for routing the input WDM wavelength groups, second wavelength demultiplexing sections each for receiving each WDM wavelength group from the routing section to output a wavelength group having a plurality of wavelengths, wavelength converting sections each for performing wavelength conversion of each optical signal of the wavelength group output from each second wavelength demultiplexing section, and second wavelength multiplexing sections each for wavelength division multiplexing optical signals output from the wavelength converting sections. This device is suitable for construction of a large-scale optical network supporting an increase in number of wavelengths.

7 Claims, 37 Drawing Sheets

F I G. 11
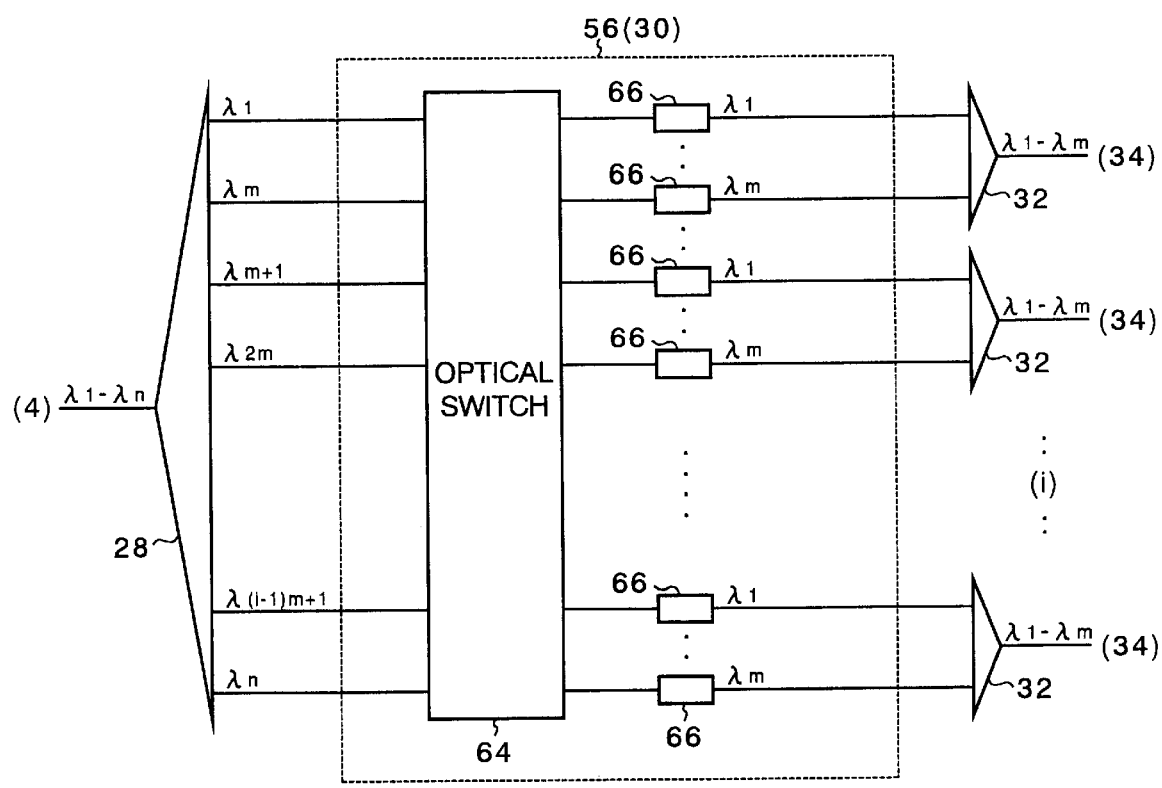

FIG. 37

|  | GENERAL EXPRESSION | SPECIFIC EXAMPLE |
|---|---|---|
| PRIOR ART (BY THE WAVELENGTH) | $(nk+Lm) \times (nk+Lm)$ | $592 \times 592 = 350464$ |
| PRESENT INVENTION (BY THE WAVELENGTH GROUP) | $(ik+L) \times (ik+L)$ | $74 \times 74 = 5476$ |

CONDITIONS:

THE NUMBER OF INPUT AND OUTPUT TRANSMISSION LINES FOR EACH : $k=3$
THE NUMBER OF WAVELENGTHS IN EACH TRANSMISSION LINE : $n=160$
THE NUMBER OF WAVELENGTHS OF EACH WAVELENGTH GROUP : $m=32$
THE NUMBER OF WAVELENGTH GROUPS IN INTER-OFFICE $(n/m)$ : $i=5$
THE NUMBER OF WAVELENGTH GROUPS IN INTRA-OFFICE : $L=5$

OPTICAL CROSS-CONNECT DEVICE AND SYSTEM HAVING THE DEVICE

BACKGROUND OF THE INVENTION

1. Field of the Invention

The present invention relates generally to an optical cross-connect device, and more particularly to an optical cross-connect device suitable for construction of a large-scale optical network supporting an increase in number of wavelengths in WDM (wavelength division multiplexing) and also to a system having the device.

2. Description of the Related Art

With high-speed and large-capacity information transmission, it is required to realize a broadband and large-capacity network and transmission system. As one of means for realizing such a network and transmission system, the construction of a WDM (wavelength division multiplexing) based optical network is desired. An optical cross-connect device (optical XC) is known as a core device used in constructing such an optical network.

Referring to FIG. 1, there is shown an example of the configuration of an optical cross-connect device and an optical network. Reference numeral 2 denotes an optical cross-connect device to which a plurality of input optical transmission lines 4 and output optical transmission lines 6 are connected. The optical cross-connect device 2 is a device for routing wavelength division multiplexed optical signals having wavelengths $\lambda_1$ to $\lambda_n$ supplied from each input optical transmission line 4 to a desired one of the output optical transmission lines 6 by the wavelength. The optical cross-connect device 2 is connected through inter-office links to other optical cross-connect devices, and optical amplifiers 8 for compensating for attenuation of optical signals are usually inserted in each inter-office link in the case of long-haul transmission. The optical cross-connect device 2 is further connected through intra-office links to another communication device, e.g., an electrical cross-connect device (electrical XC) 10. These devices are controlled by an operation system 12 managing the whole of the network.

With an increase in transmission capacity, the number of wavelengths in WDM is rapidly increasing in an optical network. The increase in number of wavelengths causes substantial enlargement in scale of an optical switch required in the optical cross-connect device, resulting in complexity of the optical cross-connect device. Thus, it is desirable to realize an optical cross-connect device suitable for construction of a large-scale optical network supporting an increase in number of wavelengths.

FIG. 2 is a block diagram showing an example of the configuration of an optical cross-connect device in the prior art. WDM signal light input from each input optical transmission line 4 is demultiplexed by a wavelength demultiplexing section 14 to obtain n optical signals having different wavelengths $\lambda_1$ to $\lambda_n$, and each optical signal is supplied to a first wavelength converting section 16. The first wavelength converting section 16 converts the input optical signal into an electrical signal, regenerates the electrical signal, and then reconverts the electrical signal into an optical signal having a required wavelength, which is next supplied to an optical switch 18. The optical switch 18 performs routing of the input optical signal to a desired output port. The wavelength of the optical signal thus routed is next converted into a wavelength for an optical transmission line by a second wavelength converting section 20. The n optical signals respectively output from the n second wavelength converting sections 20 are wavelength division multiplexed by a wavelength multiplexing section 22, and resultant WDM signal light is output to an output optical transmission line 6.

FIG. 3 is a block diagram showing an example of the configuration of another optical cross-connect device in the prior art. In this example, a time division signal demultiplexing section 24 and a time division signal multiplexing section 26 are used in place of each first wavelength converting section 16 and each second wavelength converting section 20 shown in FIG. 2, respectively, and a space switch 28 is used in place of the optical switch 18 shown in FIG. 2. In the case that the transmission speed of one wavelength is high (e.g., 40 Gb/s), this wavelength is split into lower-order (e.g., 10 Gb/s) electrical signals by the time division signal demultiplexing section 24, and these lower-order electrical signals are supplied to the space switch 28. The signals output from the space switch 28 are time division multiplexed by each time division signal multiplexing section 26, and converted into an optical signal. The n optical signals respectively output from the n time division signal multiplexing sections 26 are wavelength division multiplexed by a wavelength multiplexing section 22.

In the prior art shown in FIG. 2 or 3, a large-scale optical switch or space switch (the space switch being configured by an electrical switch or an optical switch) becomes necessary in the case of configuring a large-capacity optical cross-connect device. However, it is difficult to reduce the size of the device by the existing switching technique. Particularly in the configuration shown in FIG. 2, opto/electric conversion and electro/optic conversion are required in each of the first and second wavelength converting sections 16 and 20. Accordingly, preliminary installation of such converters by the wavelength causes a substantial reduction in efficiency.

SUMMARY OF THE INVENTION

It is therefore an object of the present invention to provide an optical cross-connect device suitable for construction of a large-scale optical network supporting an increase in number of wavelengths, and to also provide a system including the device.

The other objects of the present invention will become apparent from the following description.

In accordance with an aspect of the present invention, there is provided an optical cross-connect device. This device comprises k (k is an integer satisfying $1 \leq k$) first wavelength demultiplexing sections each for receiving WDM signal light obtained by wavelength division multiplexing n (n is an integer satisfying $1 \leq n$) optical signals having different wavelengths to demultiplex said WDM signal light into said n optical signals; k wavelength group generating sections each for receiving said n optical signals output from each first wavelength demultiplexing section to generate i (i is an integer satisfying n=im where m is an integer satisfying $1 \leq m$) wavelength groups each having m wavelengths; ik first wavelength multiplexing sections each for receiving each wavelength group output from each wavelength group generating section to multiplex the wavelengths of each wavelength group and then output a resultant WDM wavelength group; a routing section having at least ik input ports and ik output ports for routing said WDM wavelength groups between said input ports and said output ports; ik second wavelength demultiplexing sections each for receiving said WDM wavelength group output from each output port of said routing section to output a wavelength group having m wavelengths; kn wavelength converting sections each for performing wavelength conversion of each optical signal in said wavelength group output from each second wavelength demultiplexing section so as to correspond to said WDM signal light; and k second wavelength multiplexing sections each for receiving n optical signals output from said wavelength converting sections to wavelength division multiplex said n optical signals and then output resultant WDM signal light.

In accordance with another aspect of the present invention, there is provided a system suitable for construction of a large-scale optical network. This system includes a plurality of optical cross-connect devices connected by optical transmission lines. At least one of the optical cross-connect devices comprises an optical cross-connect device according to the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 11 is a block diagram showing a preferred embodiment of the input interface in the optical cross-connect device according to the present invention;

FIG. 37 is a table showing a result of comparison in required number of elements of an optical switch between the prior art and the present invention.

DETAILED DESCRIPTION OF THE PREFERRED EMBODIMENTS

Some preferred embodiments of the present invention will now be described in detail.

Figure 4:
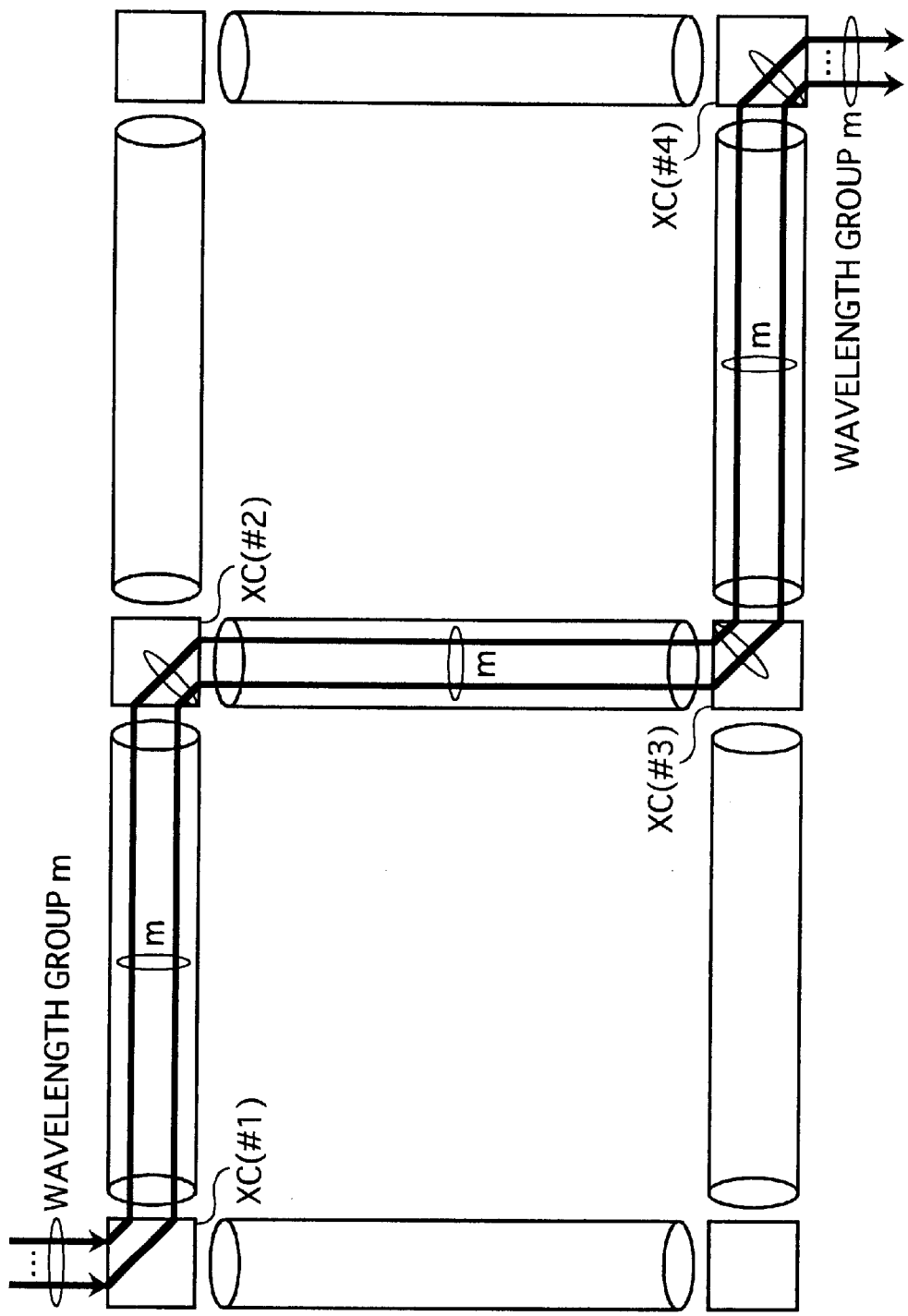
FIG. 4 is a block diagram showing the system (optical network) according to the present invention.

Referring to FIG. 4, there is shown the configuration of an optical network to which the present invention is applicable. In the case that m optical paths (m is a positive integer) are set so as to extend from an optical cross-connect device XC(#1) to another optical cross-connect device XC(#4) in accordance with an increase in traffic, wavelengths $\lambda_1$ to $\lambda_m$ in the wavelength division multiplexed condition are simultaneously routed as a wavelength group m in the present invention. In the example shown in FIG. 4, other optical cross-connect devices XC(#2) and XC(#3) are further set between the optical cross-connect devices XC(#1) and XC(#4), and the wavelength group m is routed via these optical cross-connect devices XC(#2) and XC(#3).

Figure 5:
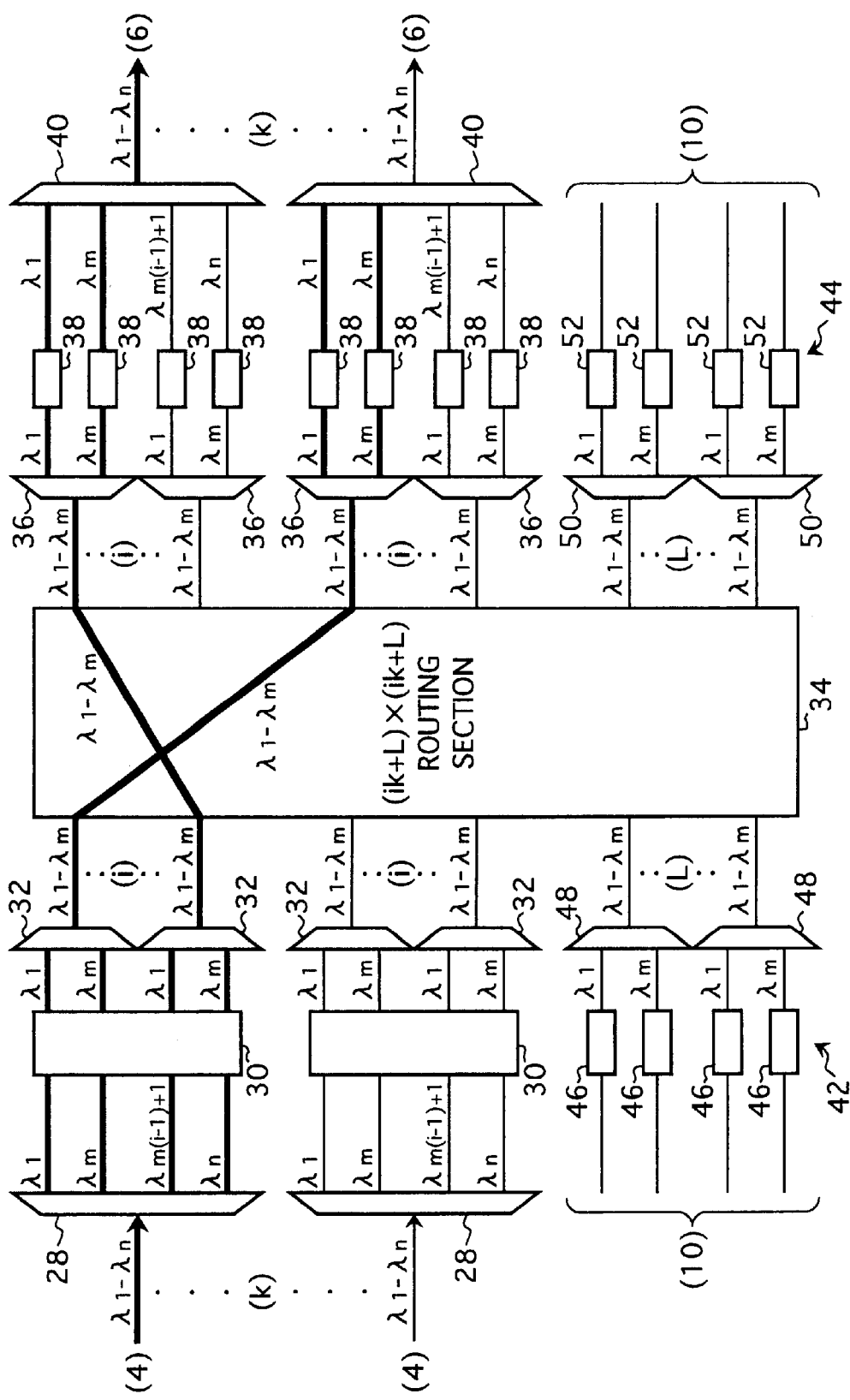
FIG. 5 is a block diagram showing a preferred embodiment of the optical cross-connect device according to the present invention.

FIG. 5 is a block diagram showing a preferred embodiment of the optical cross-connect device according to the present invention. This optical cross-connect device includes k (k is an integer satisfying 1≦k) first wavelength demultiplexing sections 28, k wavelength group generating sections 30, ik (i is an integer satisfying n=im where n is an integer satisfying 1≦n and m is an integer satisfying 1≦m) first wavelength multiplexing sections 32, a routing section 34, ik second wavelength demultiplexing sections 36, kn wavelength converting sections 38, and k second wavelength multiplexing sections 40.

Each of the first wavelength demultiplexing sections 28 is connected to an optical transmission line 4 (see FIG. 1), and receives WDM signal light obtained by wavelength division multiplexing n optical signals having different wavelengths $\lambda_1$ to $\lambda_n$ to demultiplex the WDM signal light into the n optical signals.

Each of the wavelength group generating sections 30 receives the n optical signals output from each first wavelength demultiplexing section 28 to generate i wavelength groups each having m wavelengths $\lambda_1$ to $\lambda_m$.

Each of the first wavelength multiplexing sections 32 receives each wavelength group output from each wavelength group generating section 30 to multiplex the wavelengths $\lambda_1$ to $\lambda_m$ of each wavelength group and then output a resultant WDM wavelength group.

The routing section 34 has at least ik input ports and ik output ports. The routing section 34 performs routing of the WDM wavelength groups between the input ports and the output ports.

Each of the second wavelength demultiplexing sections 36 receives the WDM wavelength group output from each output port of the routing section 34 to output a wavelength group of m wavelengths $\lambda_1$ to $\lambda_m$.

Each of the wavelength converting sections 38 performs wavelength conversion of each optical signal in the wavelength group output from each second wavelength demultiplexing section 36 so as to correspond to the abovementioned WDM signal light.

Each of the second wavelength multiplexing sections 40 receives n optical signals having wavelengths $\lambda_1$ to $\lambda_n$ output from the n wavelength converting sections 38 to multiplex the wavelengths $\lambda_1$ to $\lambda_n$ and then output resultant WDM signal light.

Figure 1:
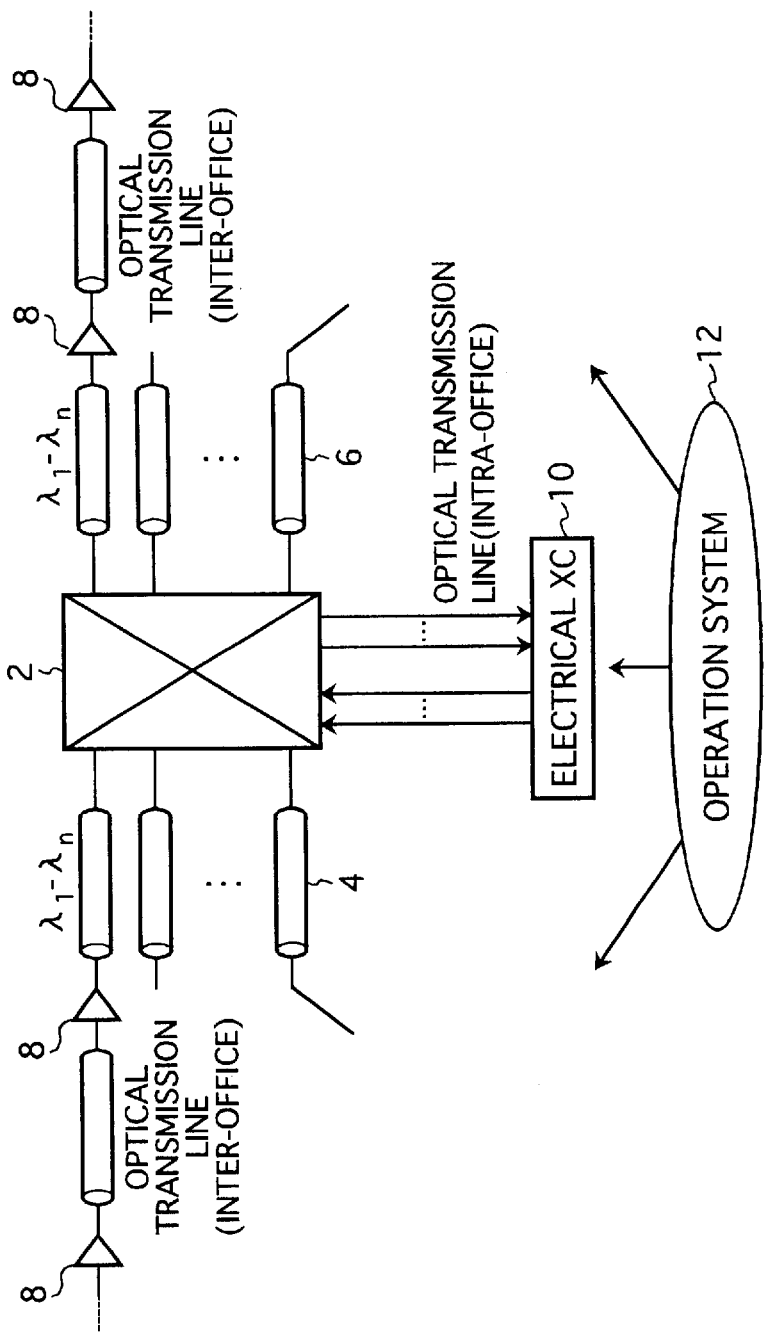
FIG. 1 is a block diagram showing an optical network to which the present invention is applicable.
Figure 2:
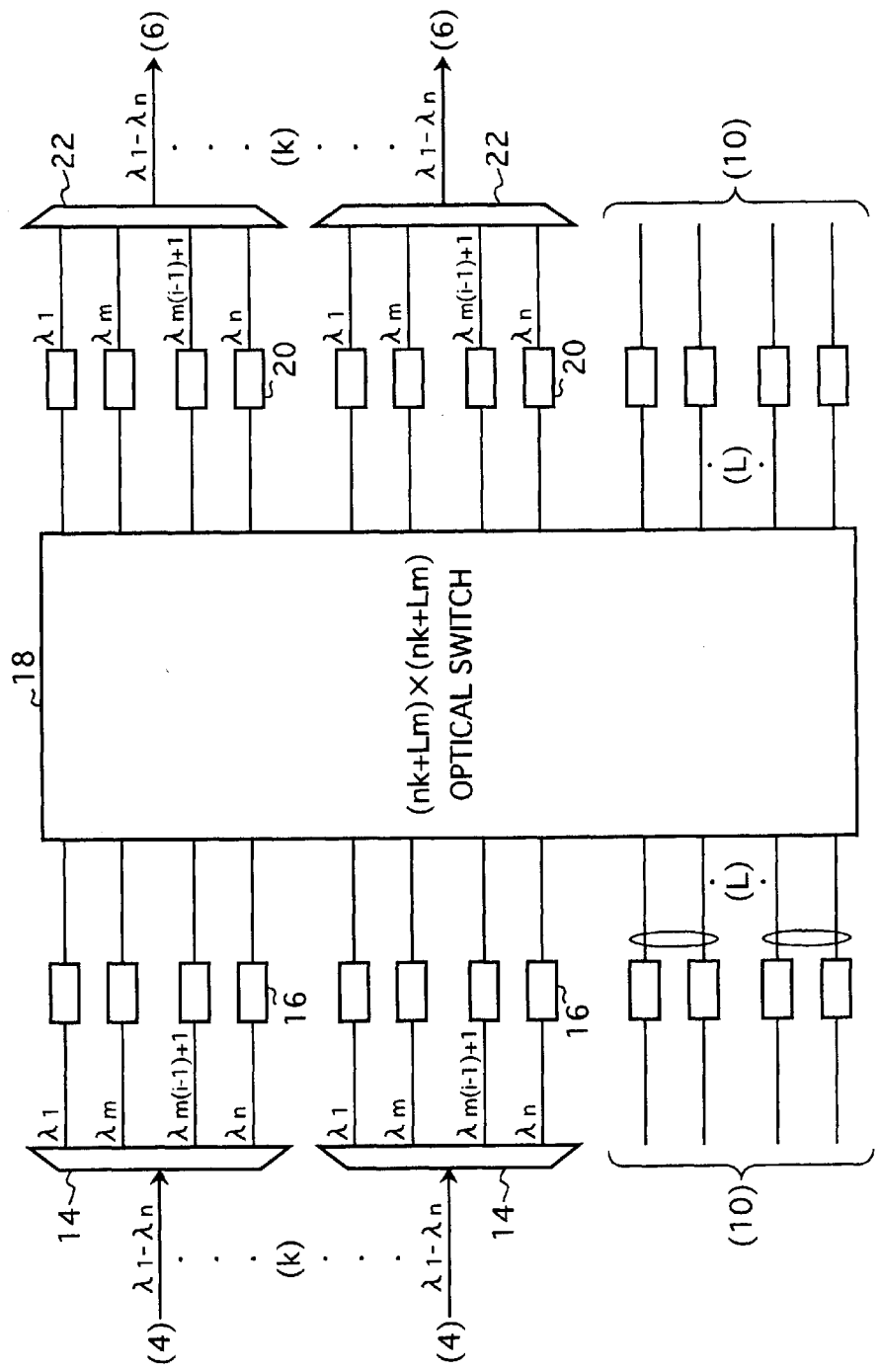
FIG. 2 is a block diagram showing an optical cross-connect device in the prior art.
Figure 3:
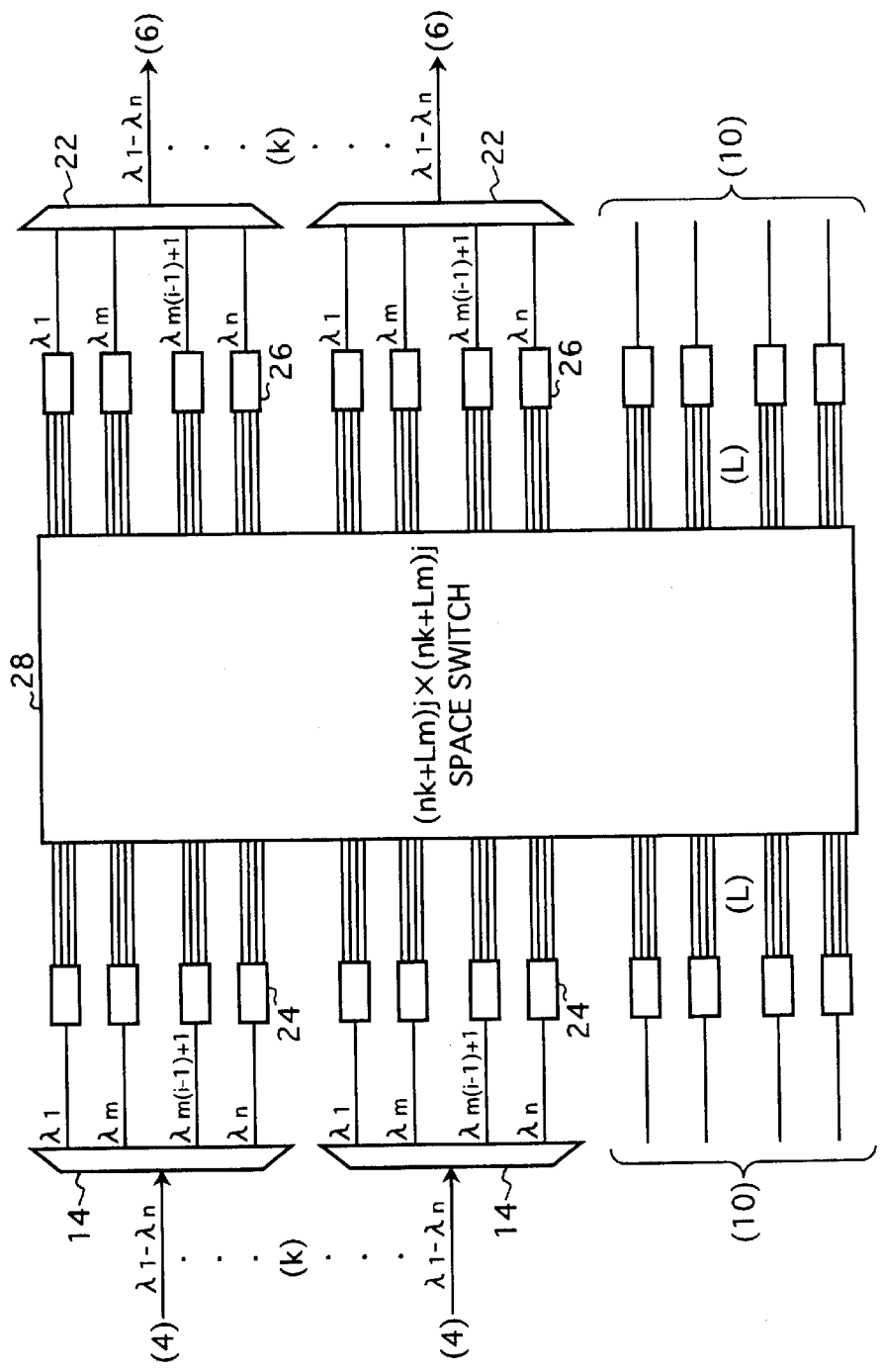
FIG. 3 is a block diagram showing another optical cross-connect device in the prior art.

Particularly in this preferred embodiment, an input link 42 and an output link 44 are connected to the routing section 34, so as to connect the routing section 34 to another communication device (e.g., the electrical cross-connect device 10 shown in FIG. 1). The input link 42 includes mL (L is an integer satisfying 1≦L) wavelength converting sections 46 for generating L wavelength groups each having m wavelengths $\lambda_1$ to $\lambda_m$, and L wavelength multiplexing sections 48 provided so as to correspond to the first wavelength multiplexing sections 32.

The output link 44 includes L wavelength demultiplexing sections 50 provided so as to correspond to the second wavelength demultiplexing sections 36, and mL wavelength converting sections 52 provided so as to correspond to the wavelength converting sections 38.

According to the preferred embodiment shown in FIG. 5, the WDM signal light supplied from the input optical transmission line 4 is divided into a plurality of wavelength groups each having wavelengths $\lambda_1$ to $\lambda_m$ to be transferred to the same destination optical cross-connect device (e.g., the transfer from the optical cross-connect device XC(#1) to the optical cross-connect device XC(#4) shown in FIG. 4 is assumed), and each wavelength group is input into the routing section 34. Accordingly, the routing section 34 can perform wavelength routing by the wavelength group rather than by the wavelength, thereby allowing a substantial reduction in size of the device.

Figure 6:
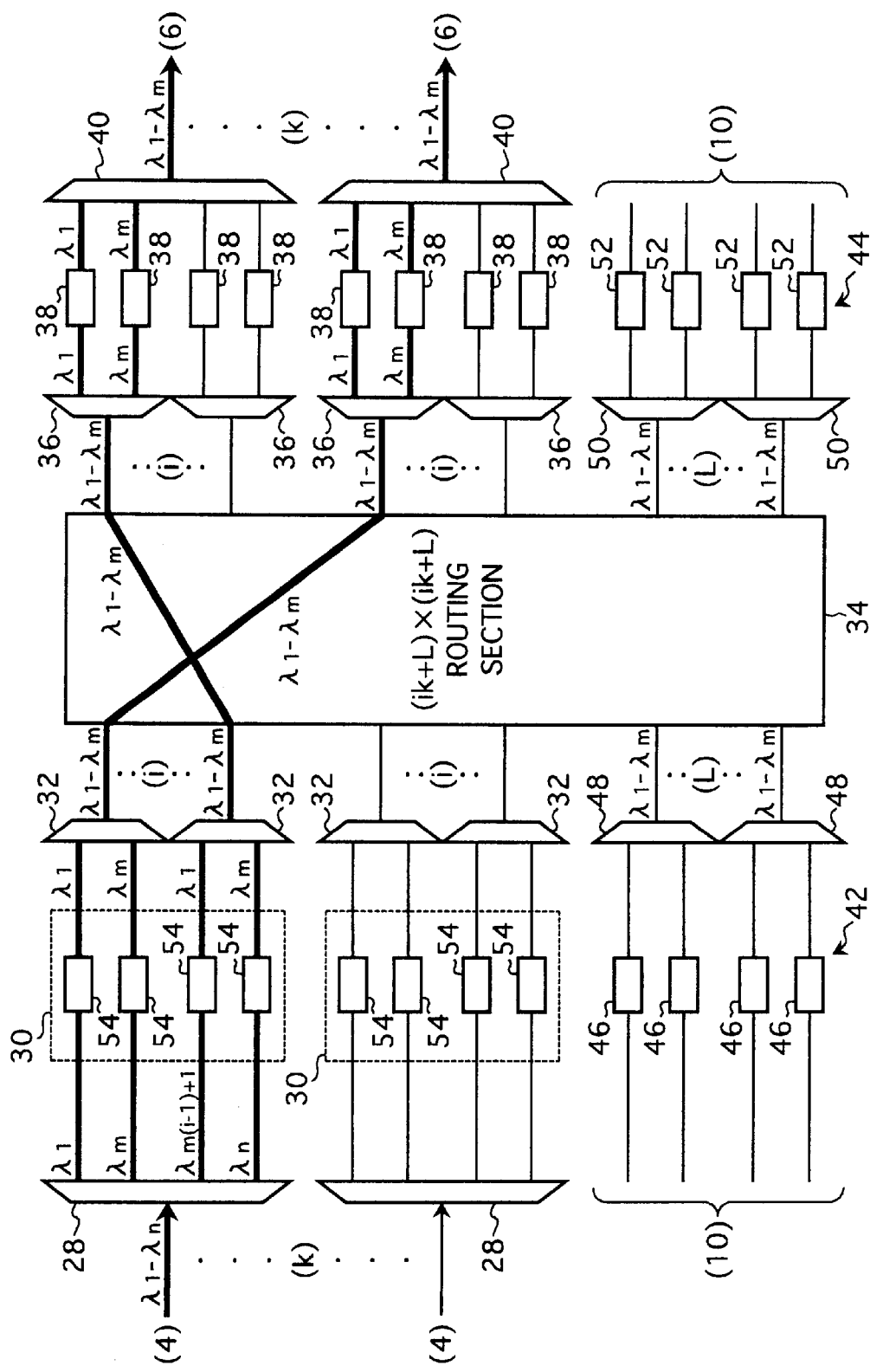
FIG. 6 is a block diagram showing a preferred embodiment of the optical cross-connect device according to the present invention.

Referring to FIG. 6, there is shown a preferred embodiment of the optical cross-connect device according to the present invention. This preferred embodiment is characterized in that each of the k wavelength group generating sections 30 shown in FIG. 5 includes n wavelength converting sections 54. The n wavelength converting sections 54 in each wavelength group generating section 30 perform wavelength conversion of the n optical signals output from each first wavelength demultiplexing section 28 to generate i wavelength groups each having wavelengths $\lambda_1$ to $\lambda_m$. Each wavelength converting section 54 may be provided by a wavelength converter not associated with opto/electric conversion, or by a wavelength converter using an opto/electric converter and an electro/optic converter.

Figure 7:
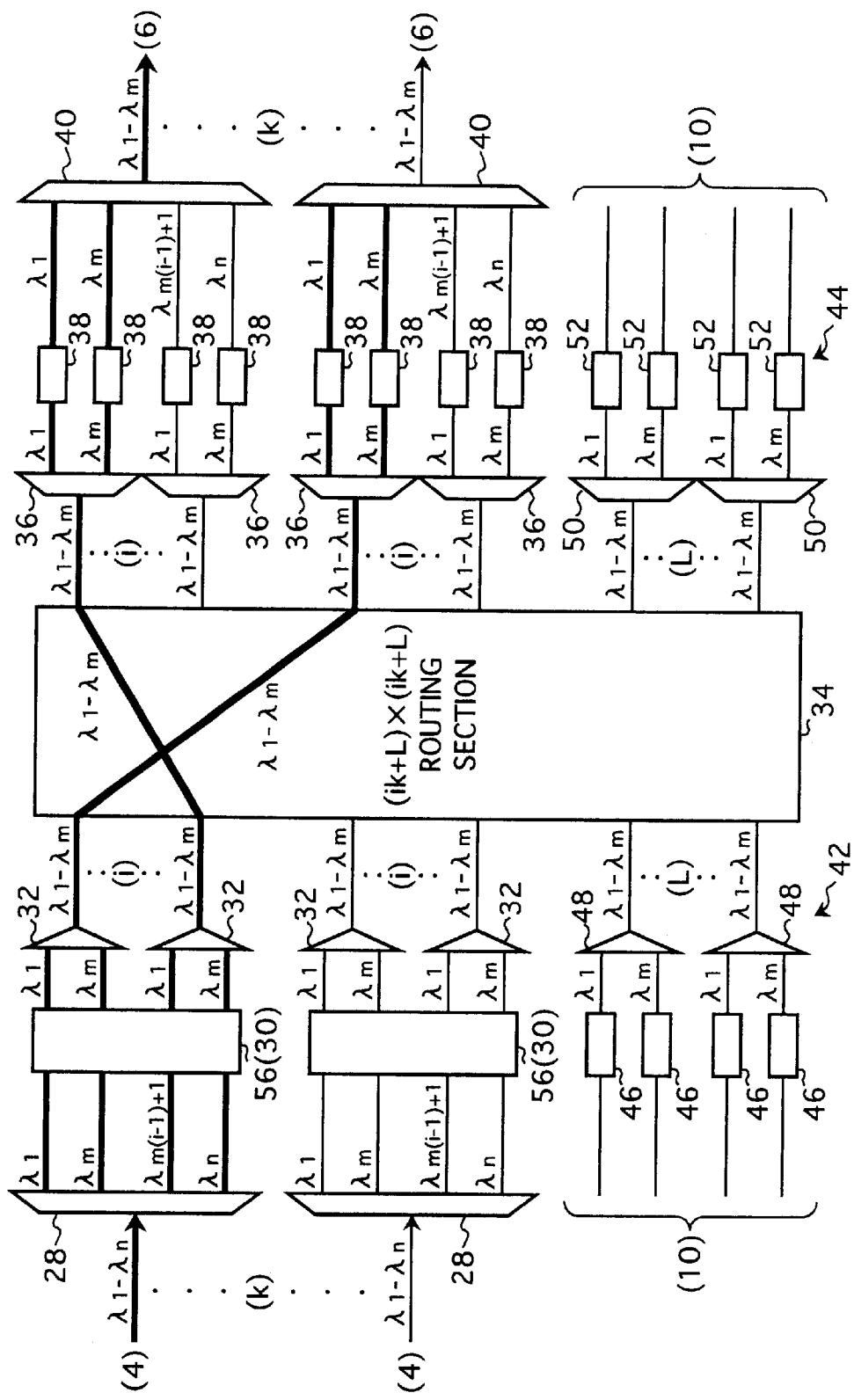
FIG. 7 is a block diagram showing a preferred embodiment of the optical cross-connect device according to the present invention.

Referring to FIG. 7, there is shown a preferred embodiment of the optical cross-connect device according to the present invention. This preferred embodiment is characterized in that each of the k wavelength group generating sections 30 shown in FIG. 5 includes a wavelength switch section 56. The wavelength switch section 56 may be provided by an n×n wavelength switch. Each wavelength switch section 56 receives the n optical signals having wavelengths $\lambda_1$ to $\lambda_n$ output from the corresponding first wavelength demultiplexing section 28 to output each optical signal to an arbitrary input port of each first wavelength multiplexing section 32.

Figure 8:
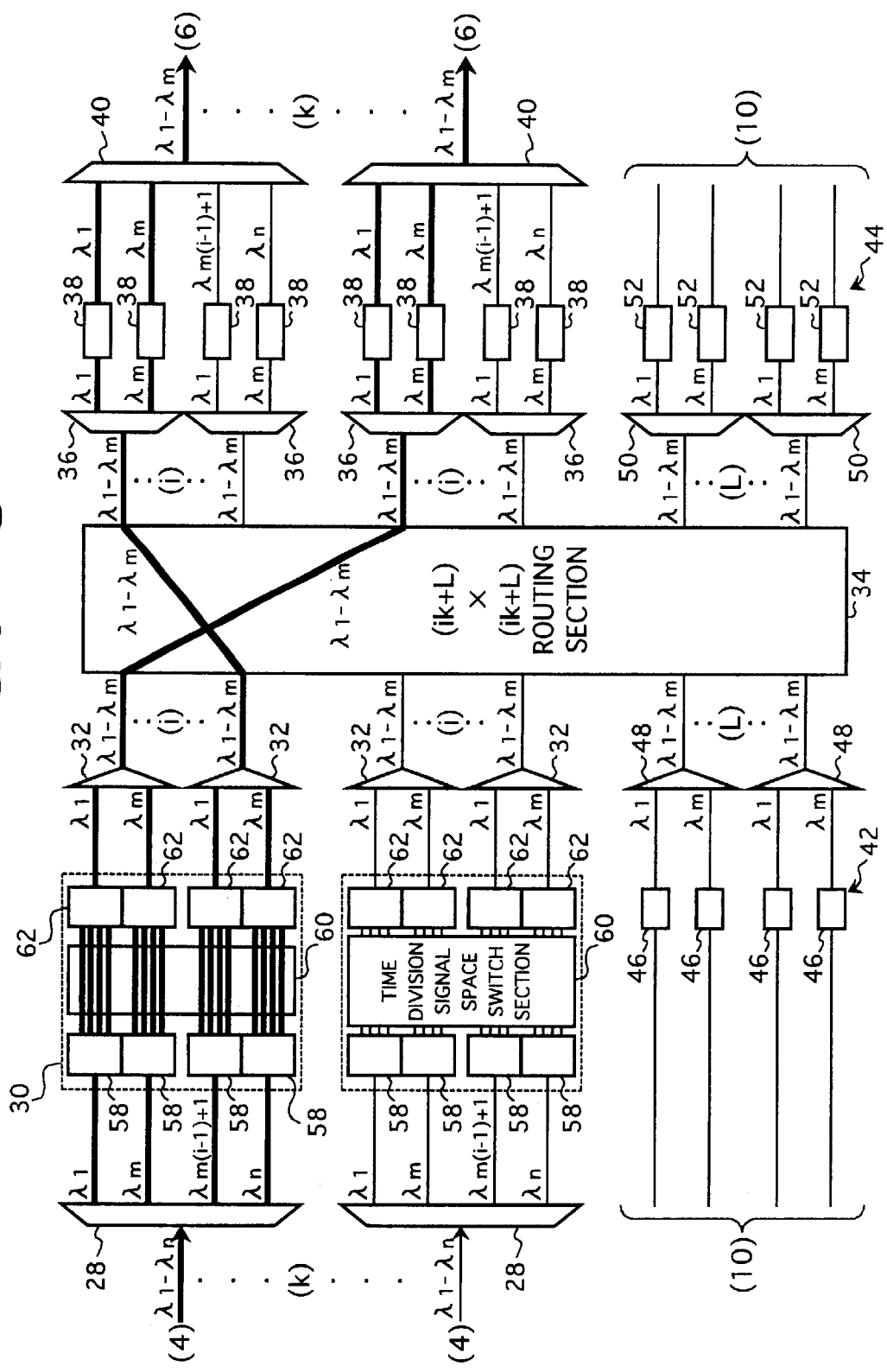
FIG. 8 is a block diagram showing a preferred embodiment of the optical cross-connect device according to the present invention.

Referring to FIG. 8, there is shown a preferred embodiment of the optical cross-connect device according to the present invention. This preferred embodiment is characterized in that each of the k wavelength group generating sections 30 shown in FIG. 5 includes n time division signal demultiplexing sections 58, a time division signal space switch section 60, and n time division signal multiplexing sections 62. Each time division signal demultiplexing section 58 demultiplexes each of the n optical signals output from the corresponding first wavelength demultiplexing section 28 into lower-speed (1/j of the speed of the optical signal) time division multiplexed signals multiplexed in the optical signal, thereby obtaining lower-speed (j-th order) signals multiplexed in the input optical signal. These lower-speed signals are supplied to the time division signal space switch section 60. The switch section 60 may be provided by an nj×nj electrical switch. The signals output from the switch section 60 are converted into optical signals having wavelengths $\lambda_1$ to $\lambda_m$ by the time division signal multiplexing sections 62, thereby obtaining the function of each wavelength group generating section 30 (see FIG. 5).

In a system to which WDM is applied, there is a case that the number of operating wavelength channels immediately after construction of the system is small and that the number of additional wavelength channels is gradually increased with an increase in transmission capacity. Some preferred embodiments suitable for such a case will now be described with reference to FIGS. 9 and 10, for example.

Figure 9:
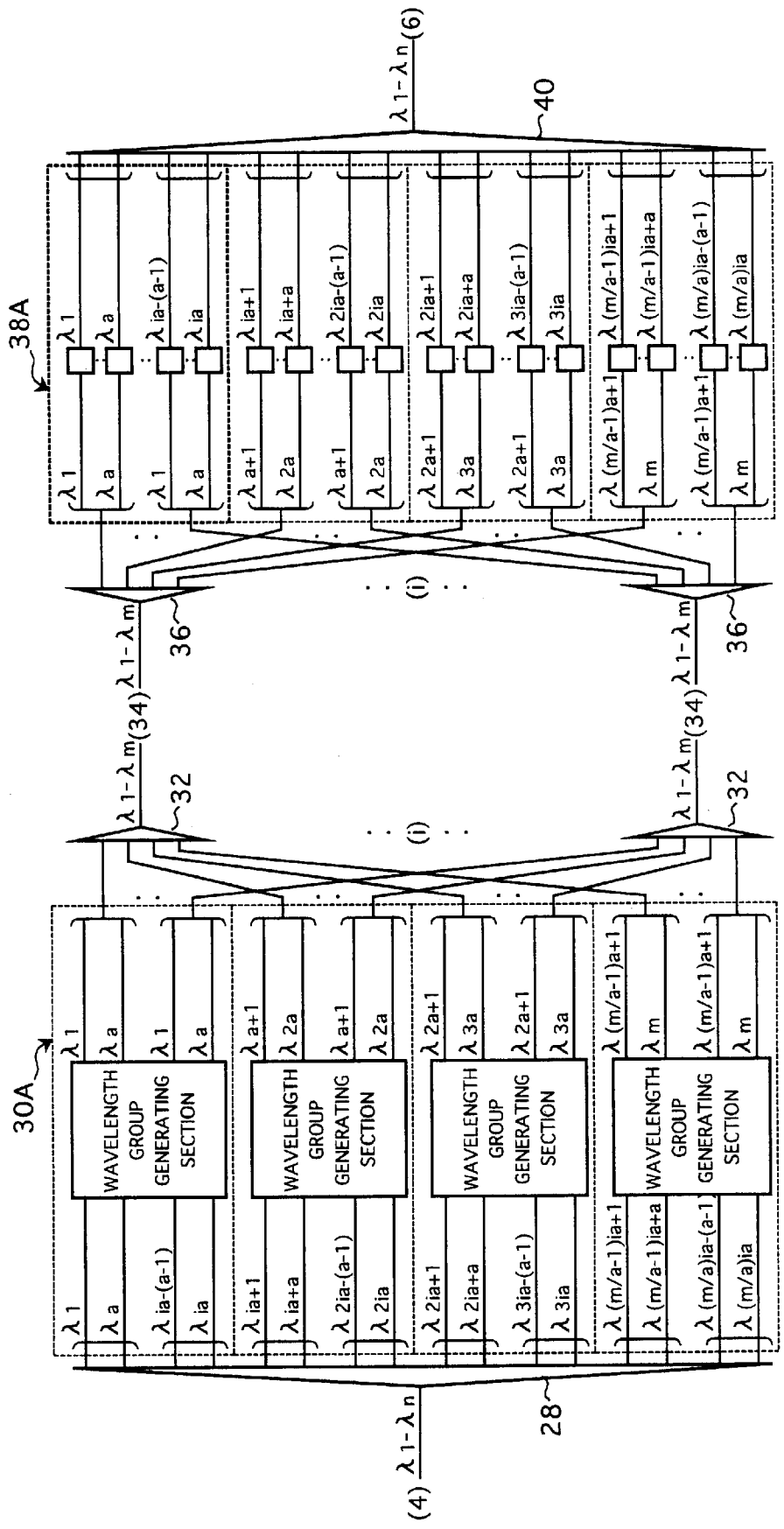
FIG. 9 is a block diagram of input and output interfaces designed to have extensibility to wavelength in the optical cross-connect device according to the present invention.

FIG. 9 is a block diagram showing the configuration of input and output interfaces designed to have extensibility to wavelength in the optical cross-connect device according to the present invention. In the input interface, one wavelength group generating section for processing wavelength groups each having wavelengths $\lambda_1$ to $\lambda_a$ is provided as an extension unit 30A immediately after construction of the system, whereas in the output interface, one second wavelength converting section for processing the wavelength groups each having wavelengths $\lambda_1$ to $\lambda_a$ is provided as an extension unit 38A so as to correspond to the input interface. With an increase in number of wavelengths, extension units similar to these extension units 30A and 38A are gradually added, thereby suppressing an initial cost in constructing the system.

Figure 10:
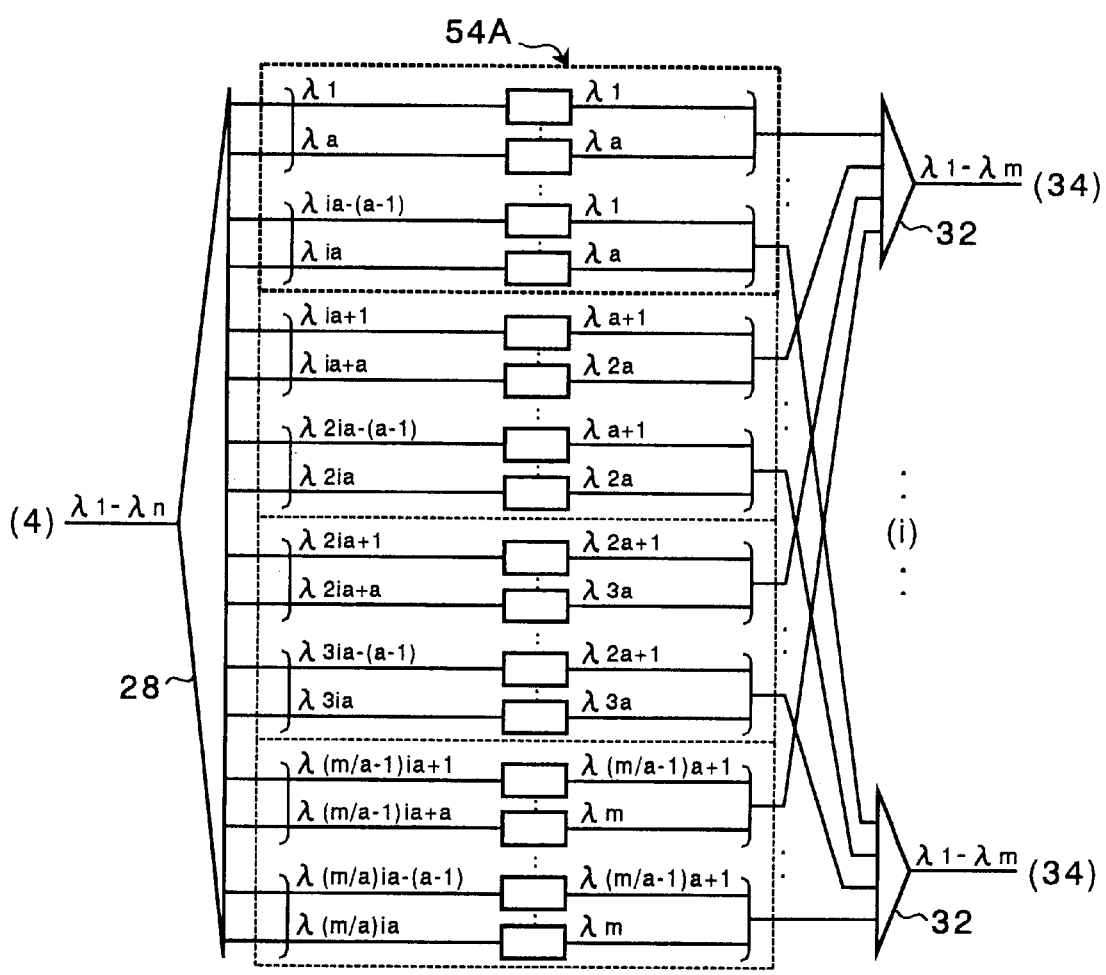
FIG. 10 is a block diagram showing a preferred embodiment of the input interface designed to have extensibility to wavelength in the optical cross-connect device according to the present invention.

FIG. 10 is a block diagram showing the configuration of another input interface designed to have extensibility to wavelength in the optical cross-connect device according to the present invention. In the specific configuration of each wavelength group generating section 30 shown in FIG. 6, one wavelength converting section for performing wavelength conversion of wavelength groups each having wavelengths $\lambda_1$ to $\lambda_a$ is provided as an extension unit 54A immediately after construction of the system. With an increase in number of wavelengths according to an increase in transmission capacity, an extension unit similar to the extension unit 54A is gradually added, thereby suppressing an initial size and cost in constructing the system.

FIG. 11 is a block diagram showing a specific configuration of each wavelength switch section 56 shown in FIG. 7. In this example, the wavelength switch section 56 includes an n×n optical switch 64 to which the n optical signals output from the corresponding first wavelength demultiplexing section 28 are supplied, and n wavelength converting sections 66 provided between the optical switch 64 and the corresponding first wavelength multiplexing sections 32.

Figure 12:
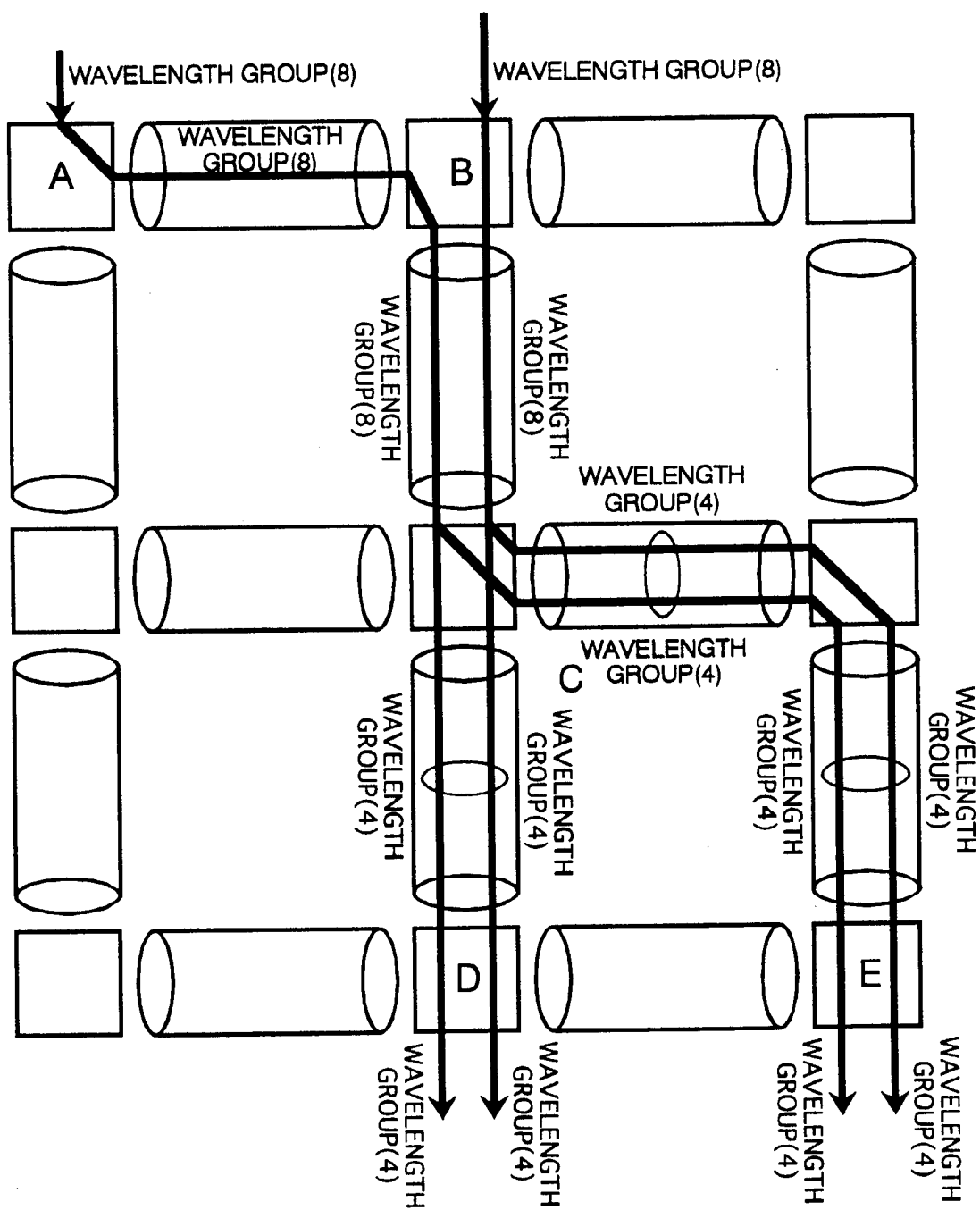
FIG. 12 is a schematic diagram for illustrating the rearrangement of wavelength groups by the use of a wavelength switch in the preferred embodiment of the present invention.

For example, FIG. 12 shows a case that the destination of a wavelength group composed of 8 wavelengths from a node A becomes nodes D and E each inputting a wavelength group composed of 4 wavelengths and that the destination of a wavelength group composed of 8 wavelengths from a node B becomes the nodes D and E each inputting a wavelength group composed of 4 wavelengths. In this case, by rearranging 4 wavelengths from the node A and 4 wavelengths from the node B into one wavelength group in the wavelength switch section 56 at a node C provided in the middle of the path, the routing section 34 can perform wavelength routing by the wavelength group composed of 8 wavelengths as in the previous preferred embodiments.

Figure 13:
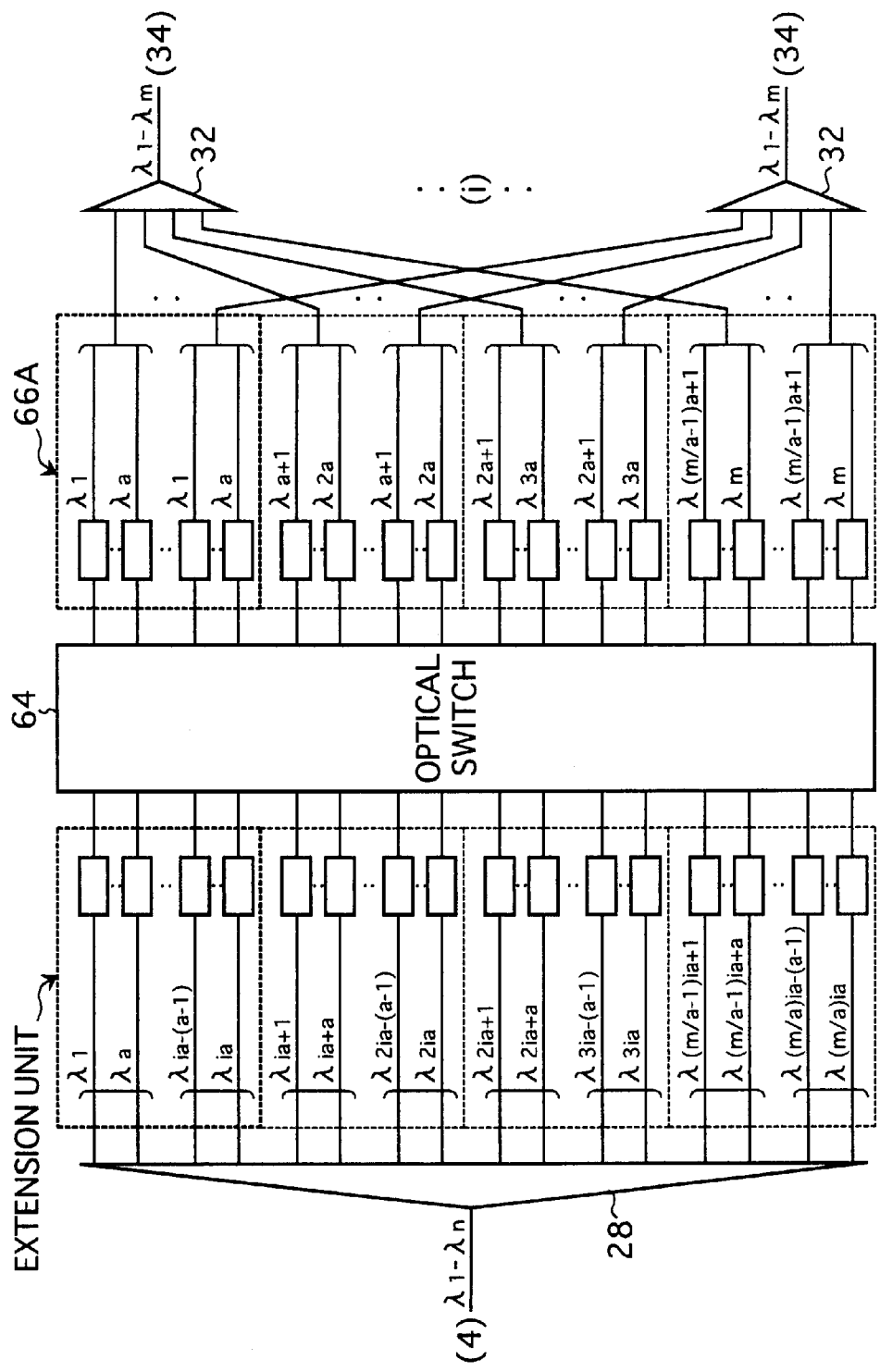
FIG. 13 is a block diagram showing a preferred embodiment of the input interface designed to have extensibility to wavelength in the optical cross-connect device according to the present invention.

FIG. 13 is a block diagram of an input interface designed to have extensibility to wavelength in the optical cross-connect device according to the present invention. In the specific configuration of the wavelength switch section 56 shown in FIG. 11, a wavelength group having wavelengths $\lambda_1$ to $\lambda_a$ is set as an extension unit, and a wavelength converting section for converting input wavelengths $\lambda_1$ to $\lambda_{ia}$ into wavelengths $\lambda_1$ to $\lambda_a$ is provided as an extension unit 66A in the case that the number of wavelengths is small. With an increase in number of input wavelengths to $\lambda_{2ia}$, $\lambda_{3ia}$, ..., $\lambda_n$, wavelength converting sections for converting the input wavelengths into wavelengths $\lambda_{a+1}$ to $\lambda_{2a}$, $\lambda_{2a+1}$ to $\lambda_{3a}$, ..., $\lambda_m$ are successively added, thereby suppressing an initial size and cost in constructing the system.

Figure 14:
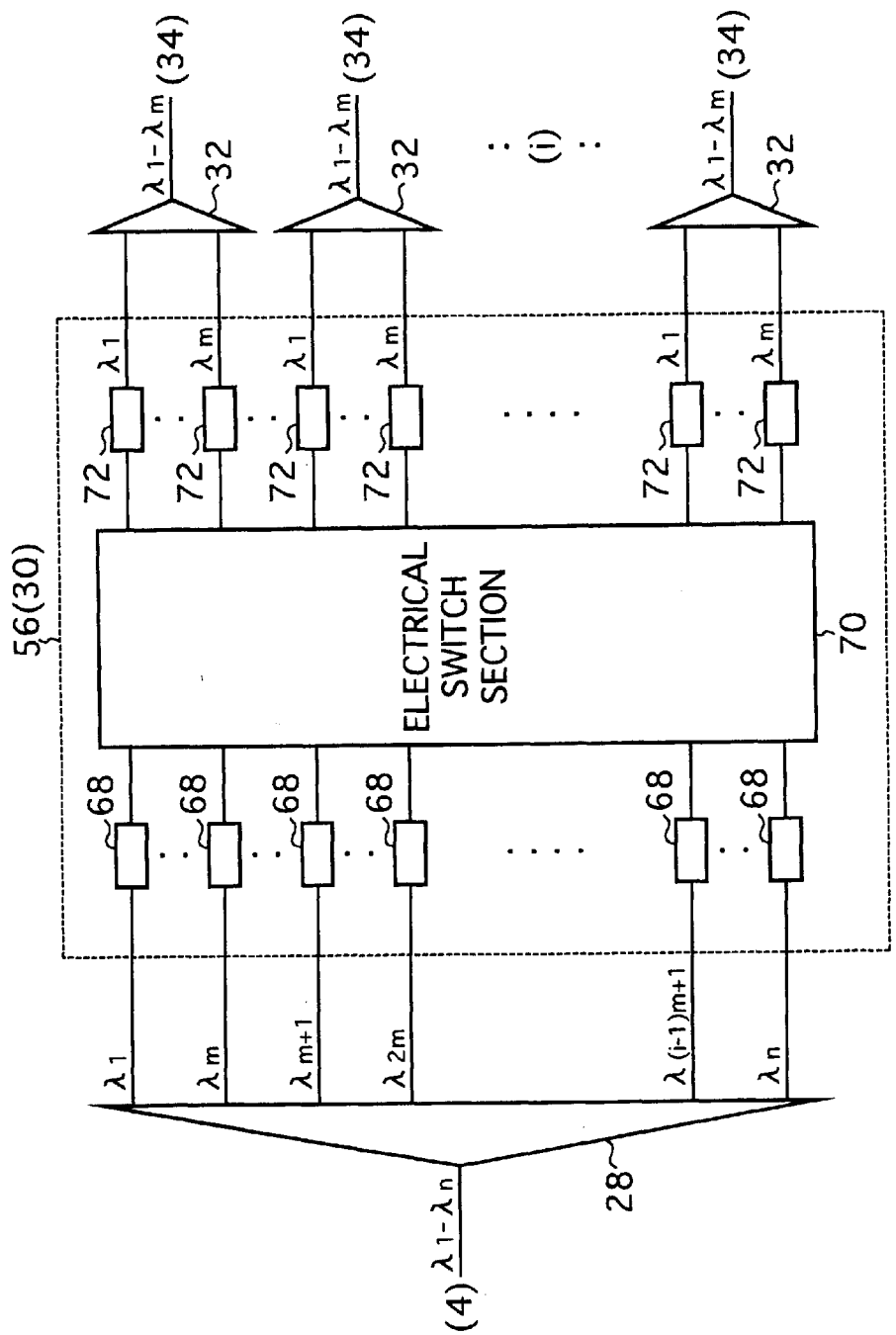
FIG. 14 is a block diagram showing a preferred embodiment of the input interface in the optical cross-connect device according to the present invention.

FIG. 14 is a block diagram showing a preferred embodiment of the input interface in the optical cross-connect device according to the present invention. More specifically, there is shown a specific configuration of each wavelength switch section 56 shown in FIG. 7. In this preferred embodiment, the wavelength switch section 56 includes n opto/electric converting sections 68 to which the n optical signals output from the first wavelength demultiplexing section 28 are respectively supplied, an n×n electrical switch section 70 to which outputs from the opto/electric converting sections 68 are supplied, and n electro/optic converting sections 72 to which outputs from the electrical switch section 70 are supplied. Each electro/optic converting section 70 outputs an optical signal having a wavelength predetermined in relation to the corresponding first wavelength multiplexing section.

According to this preferred embodiment, the rearrangement of wavelength groups as described with reference to FIG. 12 can be easily performed as in the preferred embodiment shown in FIG. 11. Further, the scale of the routing section 34 can be reduced by performing the rearrangement of wavelength groups.

Figure 15:
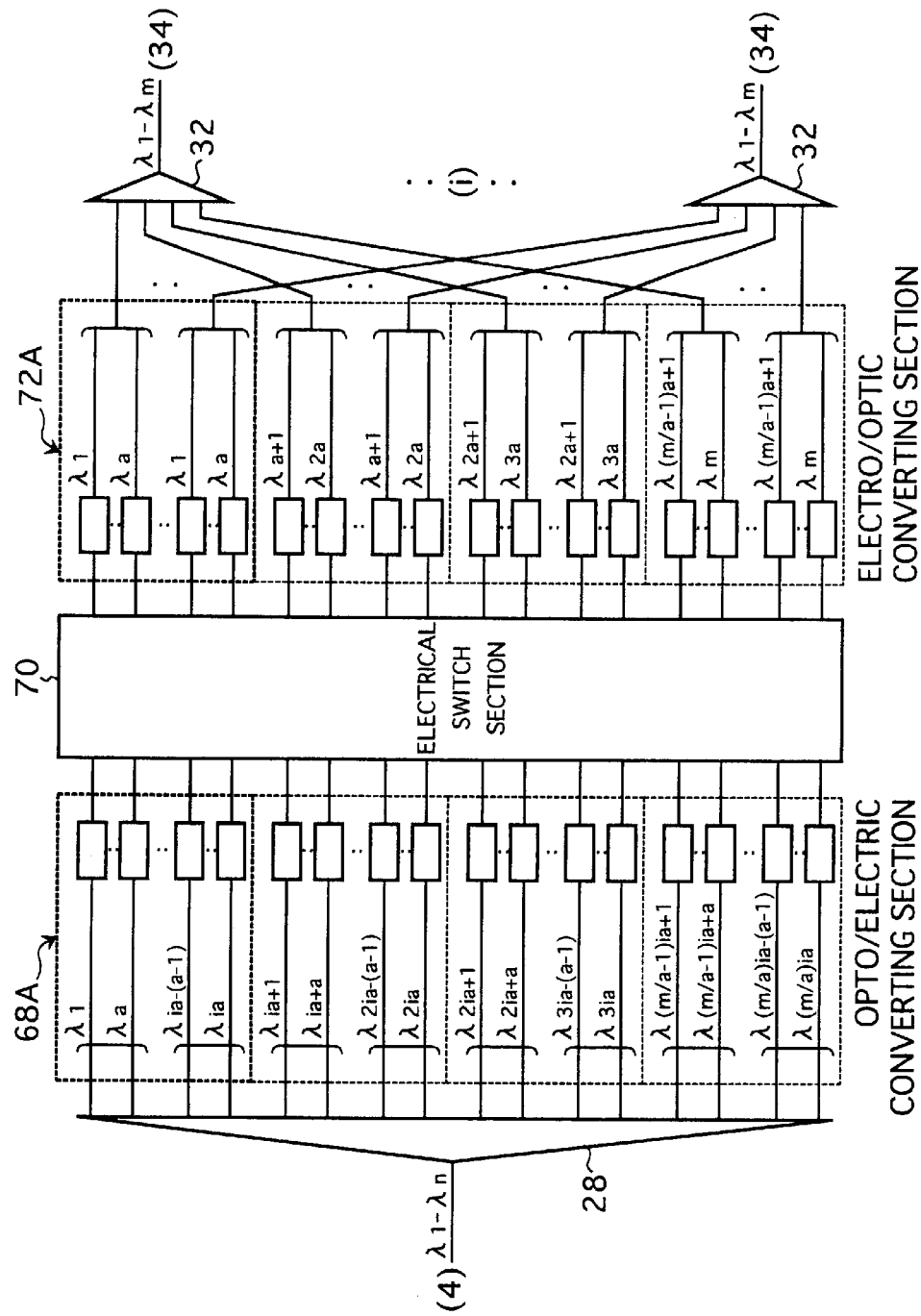
FIG. 15 is a block diagram showing a preferred embodiment of the input interface designed to have extensibility to wavelength in the optical cross-connect device according to the present invention.

FIG. 15 is a block diagram showing a preferred embodiment in which the input interface shown in FIG. 14 is modified to have extensibility. In this preferred embodiment, a wavelength group having wavelengths $\lambda_1$ to $\lambda_a$ is set as an extension unit, and in the case that the number of wavelengths is small, opto/electric converting sections for respectively converting input optical signals having wavelengths $\lambda_1$ to $\lambda_{ia}$ into electrical signals are prepared as an extension unit 68A, and electro/optic converting sections for respectively converting electrical signals output from the electrical switch section 70 into optical signals having wavelengths $\lambda_1$ to $\lambda_a$ are prepared as an extension unit 72A. With an increase in number of input wavelengths to $\lambda_{2ia}$, $\lambda_{3ia}$, ..., $\lambda_n$, the extension units 68A are successively added, and the extension units 72A for wavelength conversion to $\lambda_{a+1}$ to $\lambda_{2a}$, $\lambda_{2a+1}$ to $\lambda_{3a}$, ..., $\lambda_m$ are also successively added, thereby suppressing an initial size and cost in constructing the system.

Figure 16:
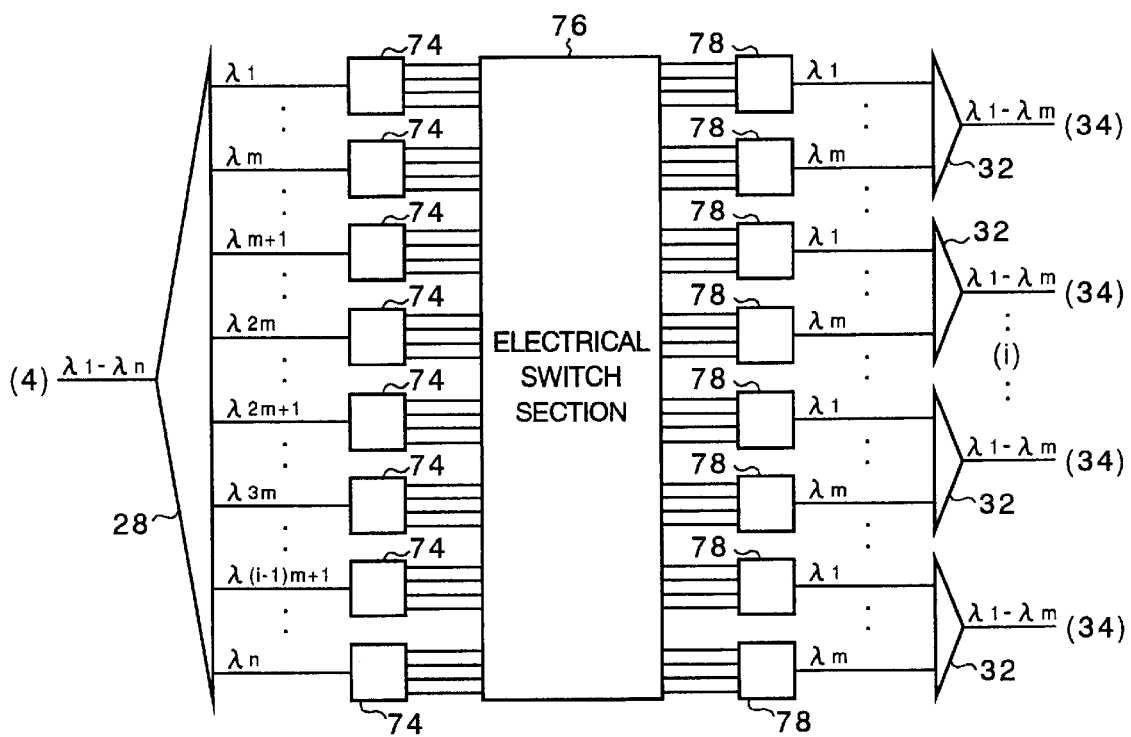
FIG. 16 is a block diagram showing a preferred embodiment of the input interface in the optical cross-connect device according to the present invention.

FIG. 16 is a block diagram showing a preferred embodiment of the input interface in the optical cross-connect device according to the present invention. More specifically, there is shown a specific configuration of each wavelength group generating section 30 shown in FIG. 8. That is, opto/electric converting and electrical signal demultiplexing sections 74, an electrical switch section 76, and electro/optic converting and electrical signal multiplexing sections 78 are provided so as to respectively correspond to the time division signal demultiplexing sections 58, the time division signal space switch section 60, and the time division signal multiplexing sections 62 shown in FIG. 8.

Each opto/electric converting and electrical signal demultiplexing section 74 converts each of the n optical signals output from the first wavelength demultiplexing section 28 into an electrical signal, and then demultiplexes the electrical signal into lower-order (1/j) electrical signals. The electrical switch section 76 is provided by an nj×nj electrical switch because the number of the opto/electric converting and electrical signal demultiplexing sections 74 is n. In accordance therewith, the number of the electro/optic converting and electrical signal multiplexing sections 78 is n, and each electro/optic converting and electrical signal multiplexing section 78 performs time division multiplexing of lower-order electrical signals output from the electrical switch section 76 to obtain an electrical signal, and then converts this electrical signal into an optical signal having a predetermined wavelength, which is in turn output to the corresponding first wavelength multiplexing section 32.

It is now assumed that the transmission speed of one wavelength increases from 10 Gb/s to 40 Gb/s. That is, consider a case that electrical signals of 10 Gb/s are time division multiplexed to an electrical signal of 40 Gb/s, and this electrical signal is converted into an optical signal.

Figure 17:
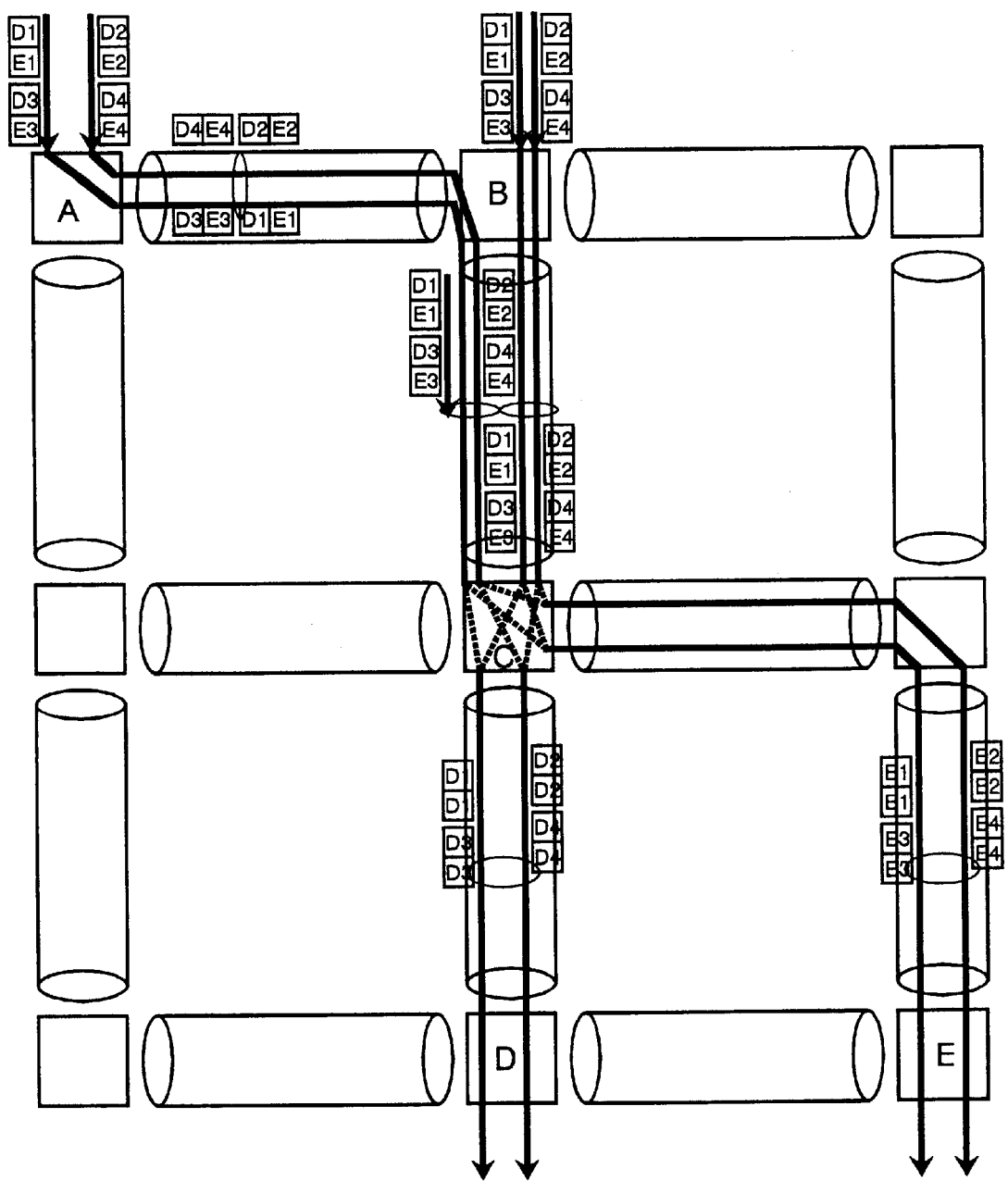
FIG. 17 is a schematic diagram for illustrating the rearrangement of wavelength groups by the use of a time division signal space switch in the preferred embodiment of the present invention.

As shown in FIG. 17, each of 10 Gb/s-equivalent time division multiplexed signals (D1, E1, D3, E3) and (D2, E2, D4, E4) to be transferred from a node A through a node B and a node C to a node D and a node E is multiplexed to one wavelength. Similarly, each of 10 Gb/s-equivalent time division multiplexed signals (D1, E1, D3, E3) and (D2, E2, D4, E4) to be transferred from the node B through the node C to the node D and the node E is multiplexed to one wavelength. The two wavelengths from the node A to the node C are routed as a wavelength group, and the two wavelengths from the node B to the node C are routed as a wavelength group. At the node C, each time division multiplexed signal is once split by using the time division signal space switch section 60 shown in FIG. 8 or the electrical switch section 76 shown in FIG. 16, and these split signals are rearranged to wavelength groups to be supplied to the same destination. Thus, by the rearrangement of wavelength groups, the scale of the routing section 34 can be greatly reduced.

Figure 19:
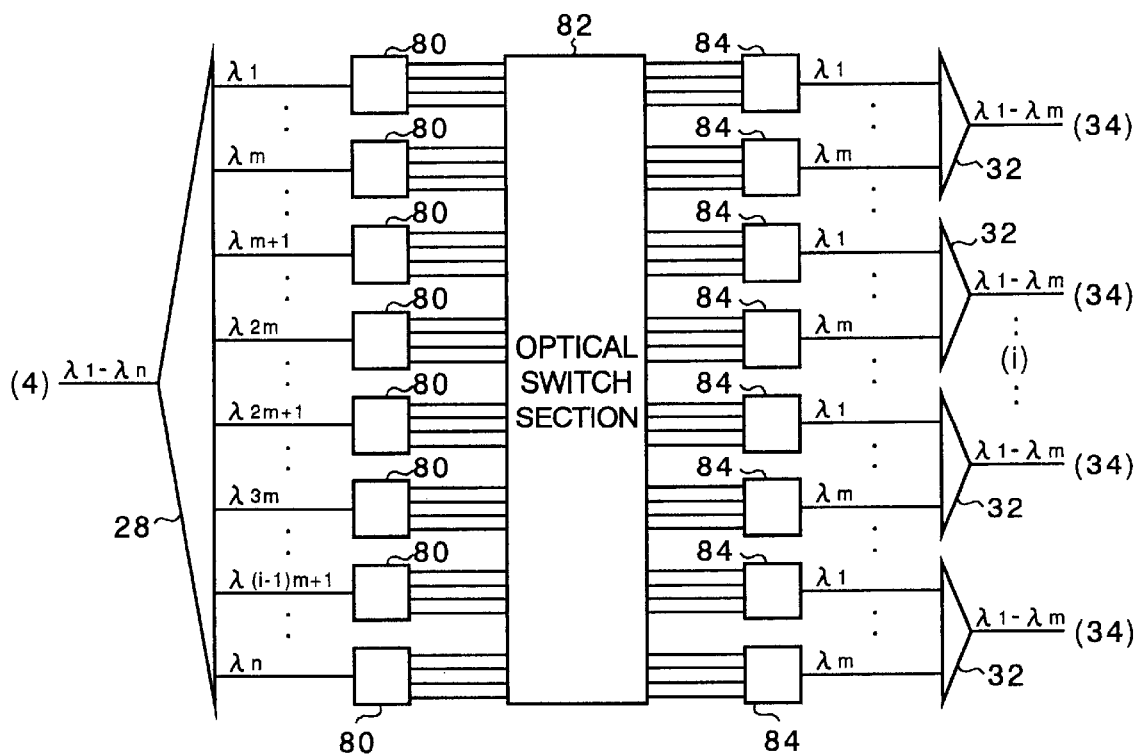
FIG. 19 is a block diagram showing a preferred embodiment of the input interface in the optical cross-connect device according to the present invention.

FIG. 19 is a block diagram showing a preferred embodiment of the input interface in the optical cross-connect device according to the present invention. In this preferred embodiment, opto/electric converting, electrical signal demultiplexing, and electro/optic converting sections 80, an optical switch section 82, and opto/electric converting, electrical signal multiplexing, and electro/optic converting sections 84 are provided in place of the opto/electric converting and electrical signal demultiplexing sections 74, the electrical switch section 76, and the electro/optic converting and electrical signal multiplexing sections 78 shown in FIG. 16. That is, switching by optical signals is performed instead of switching by electrical signals. Also according to this preferred embodiment, the rearrangement of wavelength groups can be easily performed to thereby reduce the scale of the routing section 34.

Figure 18:
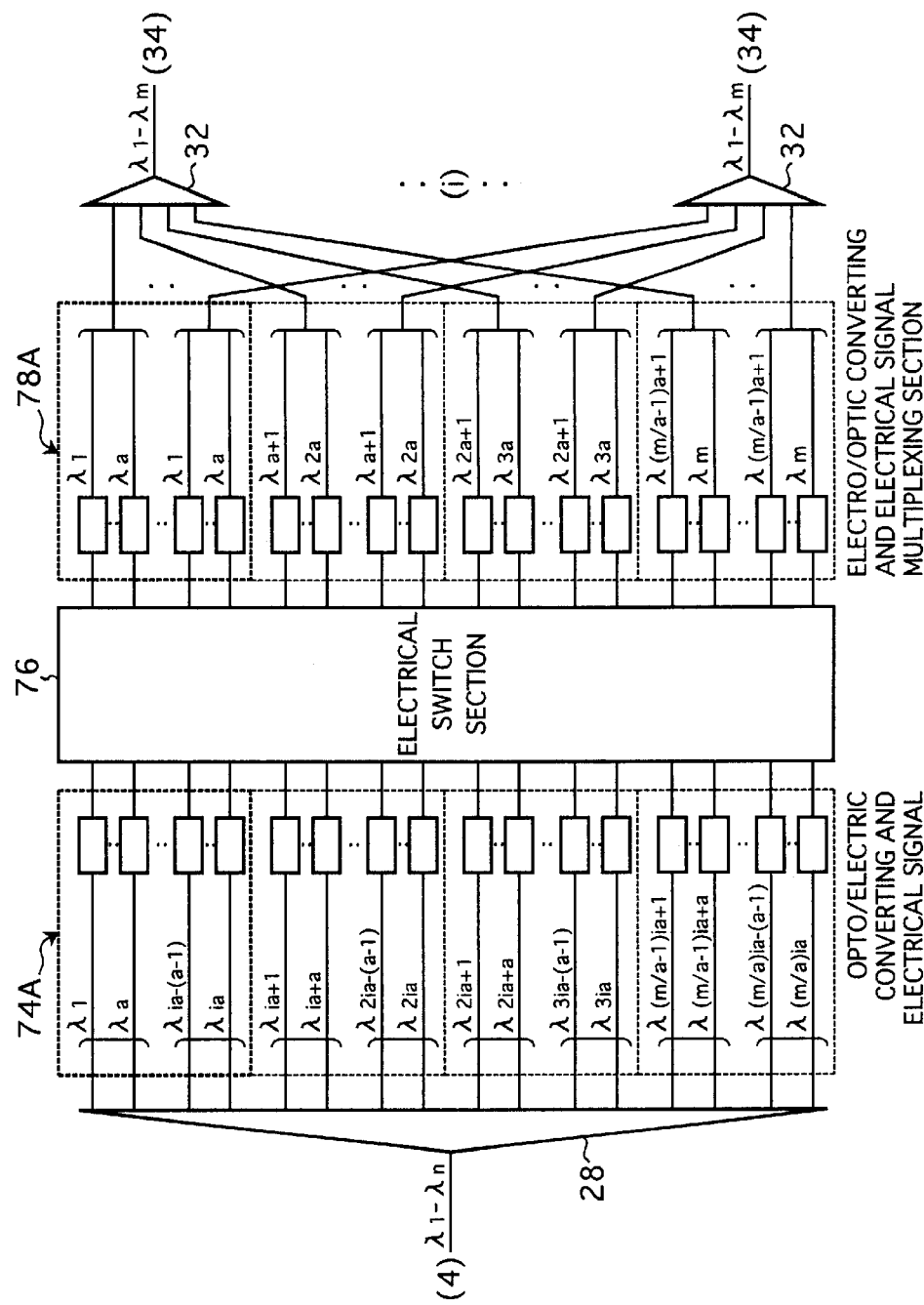
FIG. 18 is a block diagram showing a preferred embodiment of the input interface designed to have extensibility to wavelength in the optical cross-connect device according to the present invention.
Figure 20:
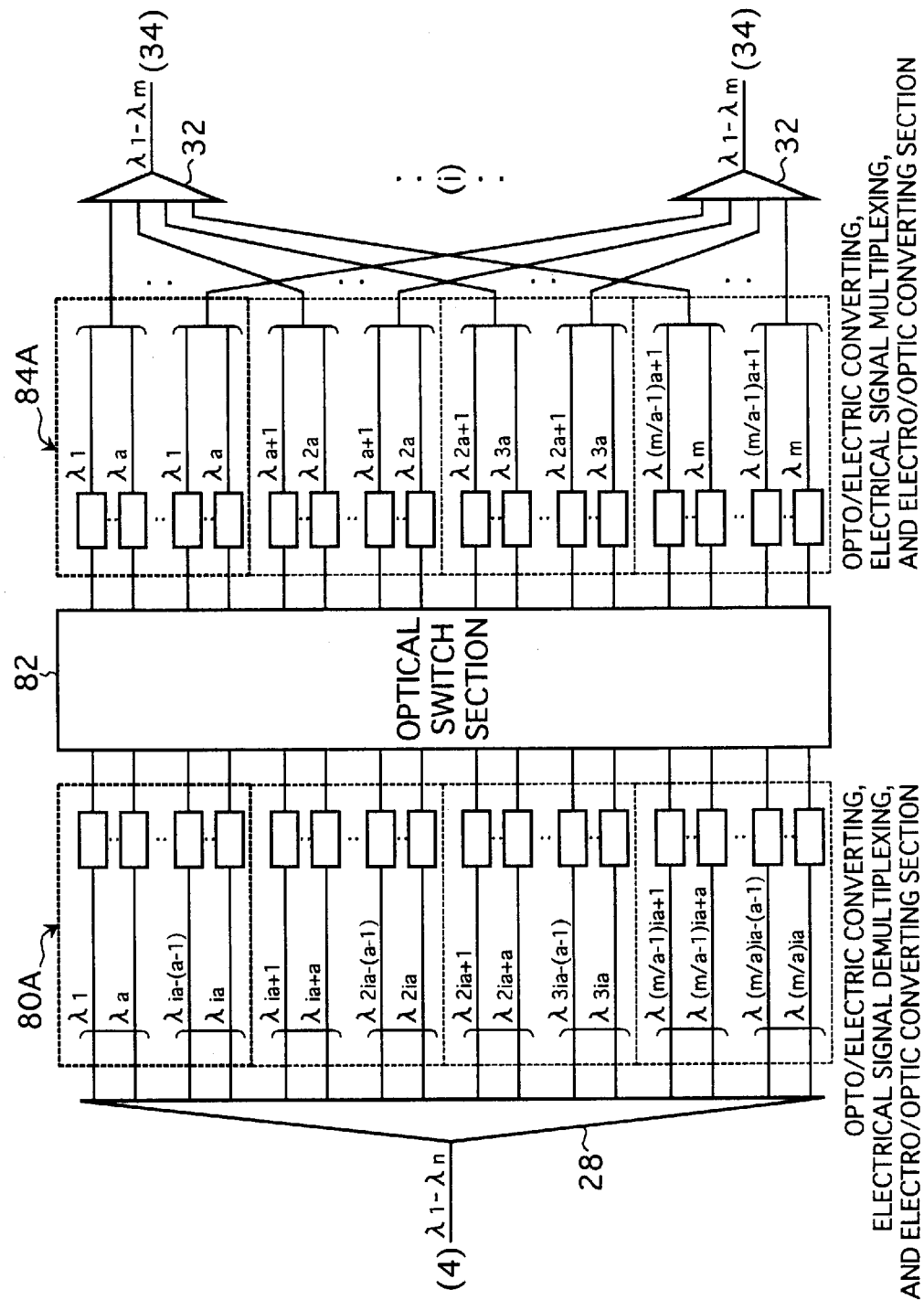
FIG. 20 is a block diagram showing a preferred embodiment of the input interface designed to have extensibility to wavelength in the optical cross-connect device according to the present invention.

FIG. 18 and FIG. 20 are block diagrams showing preferred embodiments of the input interface designed to have extensibility to wavelength in the optical cross-connect device according to the present invention. As an extension unit of the opto/electric converting and electrical signal demultiplexing sections 74 and an extension unit of the electro/optic converting and electrical signal multiplexing sections 78 in the preferred embodiment shown in FIG. 16, an extension unit 74A and an extension unit 78A are used, respectively, as shown in FIG. 18. Similarly, an extension unit 80A and an extension unit 84A are used as an extension unit of the opto/electric converting, electrical signal demultiplexing, and electro/optic converting sections 80 and an extension unit of the opto/electric converting, electrical signal multiplexing, and electro/optic converting sections 84 in the preferred embodiment shown in FIG. 19, respectively, as shown in FIG. 20. Also according to this preferred embodiment, an initial size and cost in constructing the system can be suppressed as in the preferred embodiment shown in FIG. 18.

Figure 21:
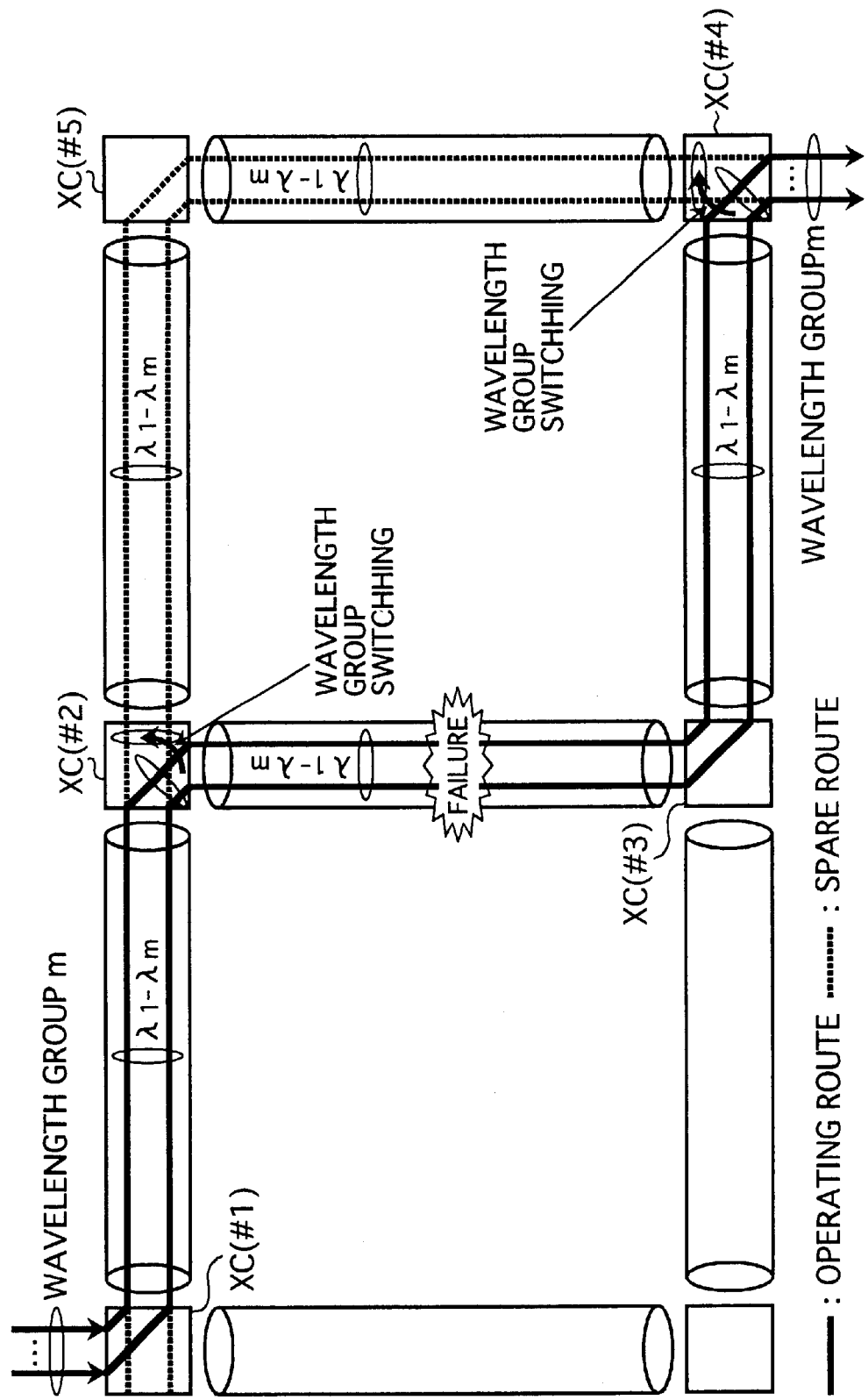
FIG. 21 is a schematic diagram for illustrating failure restoration in a preferred embodiment of the system according to the present invention.

FIG. 21 is a schematic diagram for illustrating failure restoration in the system according to the present invention. For example, in the case that the route of a wavelength group having wavelengths $\lambda_1$ to $\lambda_m$ is ensured so as to extend from the optical cross-connect device XC(#1) through the optical cross-connect devices XC(#2) and XC(#3) in this order to the optical cross-connect device XC(#4) as shown in FIG. 4, it is assumed that a failure occurs in the optical transmission line between the optical cross-connect devices XC(#2) and XC(#3). In this case, the wavelength group is switched at the optical cross-connect devices XC(#2) and XC(#4) to thereby bypass the operating route between the optical cross-connect devices XC(#2) and XC(#4) to a spare route. The spare route includes an optical cross-connect device XC(#5), for example.

According to this preferred embodiment, the wavelength group can be switched in the wavelength division multiplexed condition in the case of failure restoration, so that the scale of the routing section can be reduced.

For better understanding of the above preferred embodiments of the present invention, there will now be described some preferred embodiments using common specific numerical examples. In the following description, the number of input transmission lines is 3, the number of wavelengths per input transmission line is 160, the number of input channels from an intra-office transmission line is 160 (=32×5), and the number of wavelengths constituting a wavelength group is 32. As a result, a 20×20 optical switch is used as the routing section 34 to be used for wavelength routing.

Figure 22:
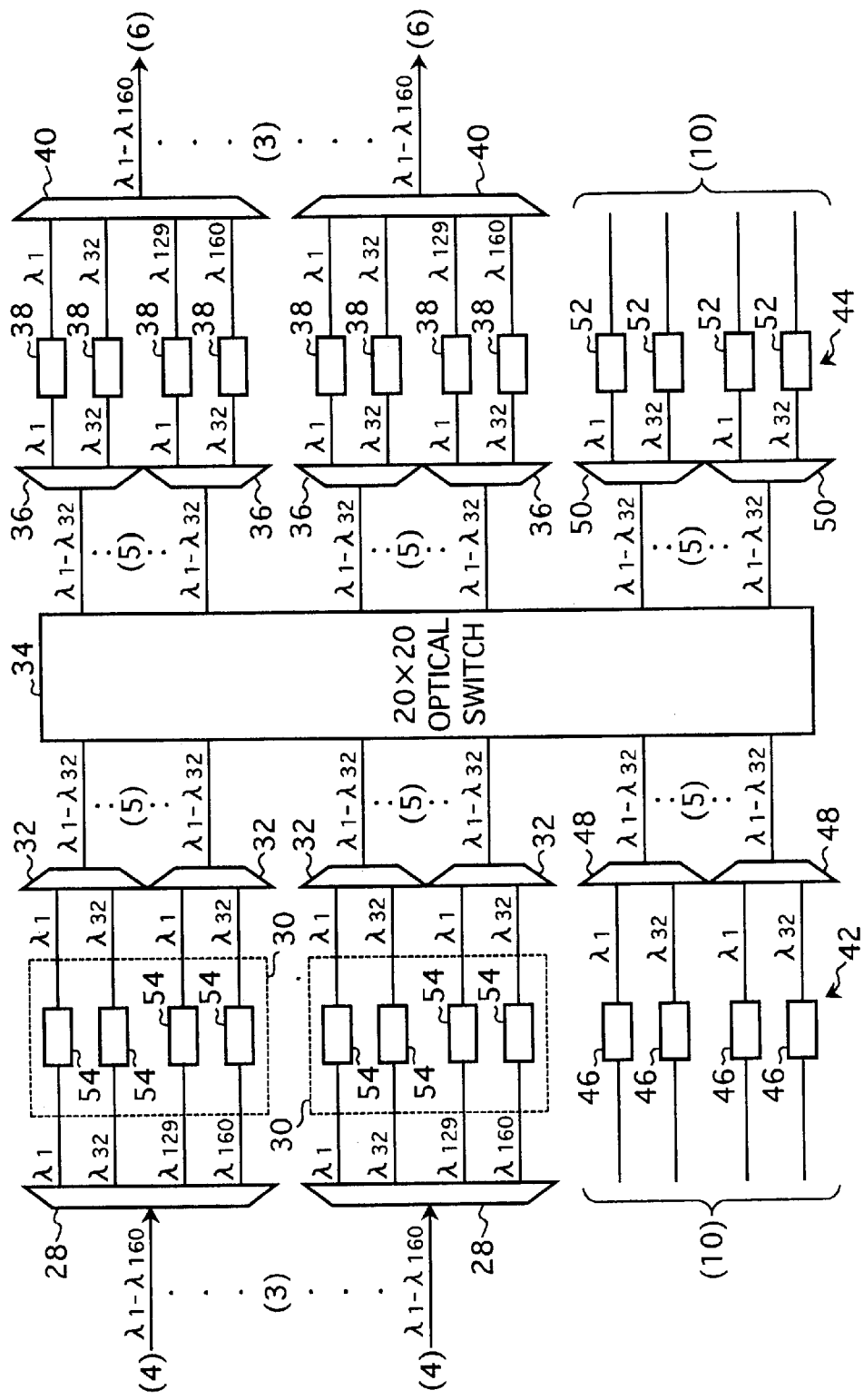
FIG. 22 is a block diagram showing a specific example of the preferred embodiment of the optical cross-connect device according to the present invention.

Referring to FIG. 22, there is shown a preferred embodiment of the optical cross-connect device according to the present invention. More specifically, there is shown a specific embodiment of the optical cross-connect device shown in FIG. 6. A demultiplexer is used as each first wavelength demultiplexing section 28. A 3R (Reshaping, Reamplification, and Retiming) transponder is used as each of the wavelength converting sections 54, 38, 46, and 52. A multiplexer is used as each first wavelength multiplexing section 32. A 20×20 optical switch is used as the routing section 34. A demultiplexer is used as each second wavelength demultiplexing section 36. A multiplexer is used as each second wavelength multiplexing section 40. In the following preferred embodiments, the description of a specific embodiment of a common component may be omitted.

Figure 23:
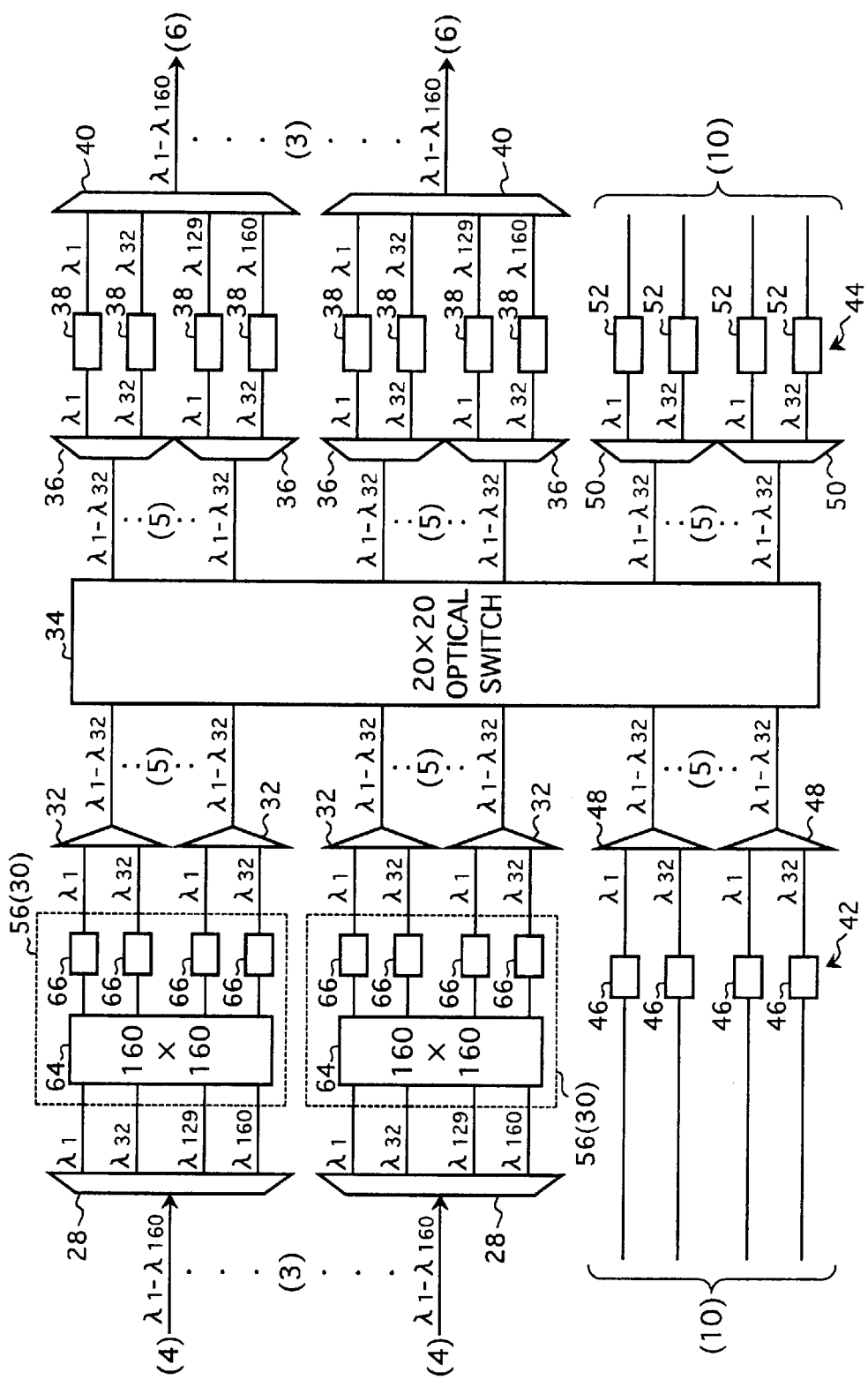
FIG. 23 is a block diagram showing a specific example of the preferred embodiment of the optical cross-connect device according to the present invention.

Referring to FIG. 23, there is shown a preferred embodiment of the optical cross-connect device according to the present invention. More specifically, there is shown a specific embodiment using the input interface shown in FIG. 11 in the optical cross-connect device shown in FIG. 7.

Figure 24:
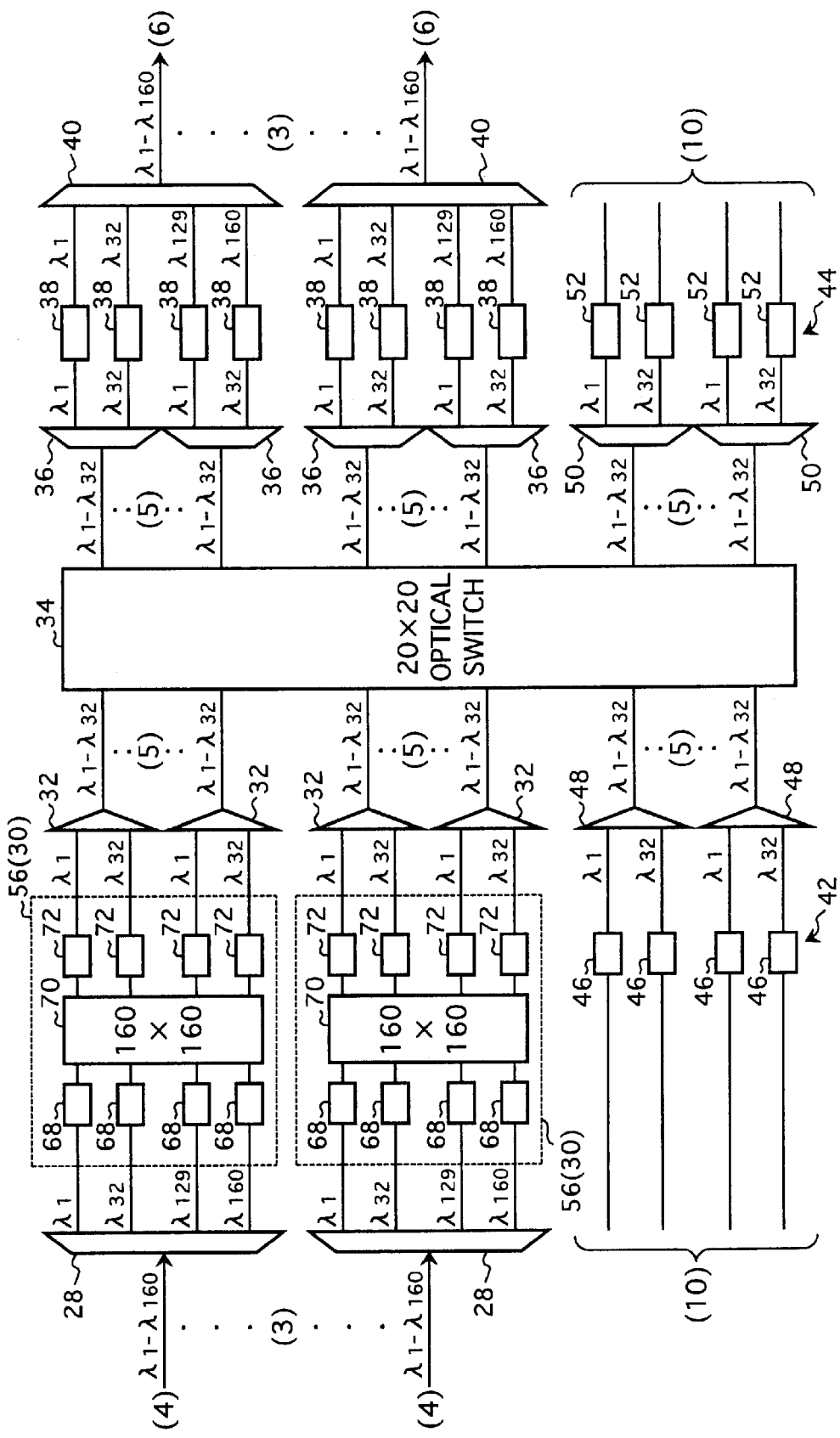
FIG. 24 is a block diagram showing a specific example of the preferred embodiment of the optical cross-connect device according to the present invention.

Referring to FIG. 24, there is shown a preferred embodiment of the optical cross-connect device according to the present invention. More specifically, there is shown a specific embodiment using the input interface shown in FIG. 14 in the optical cross-connect device shown in FIG. 7.

Figure 25:
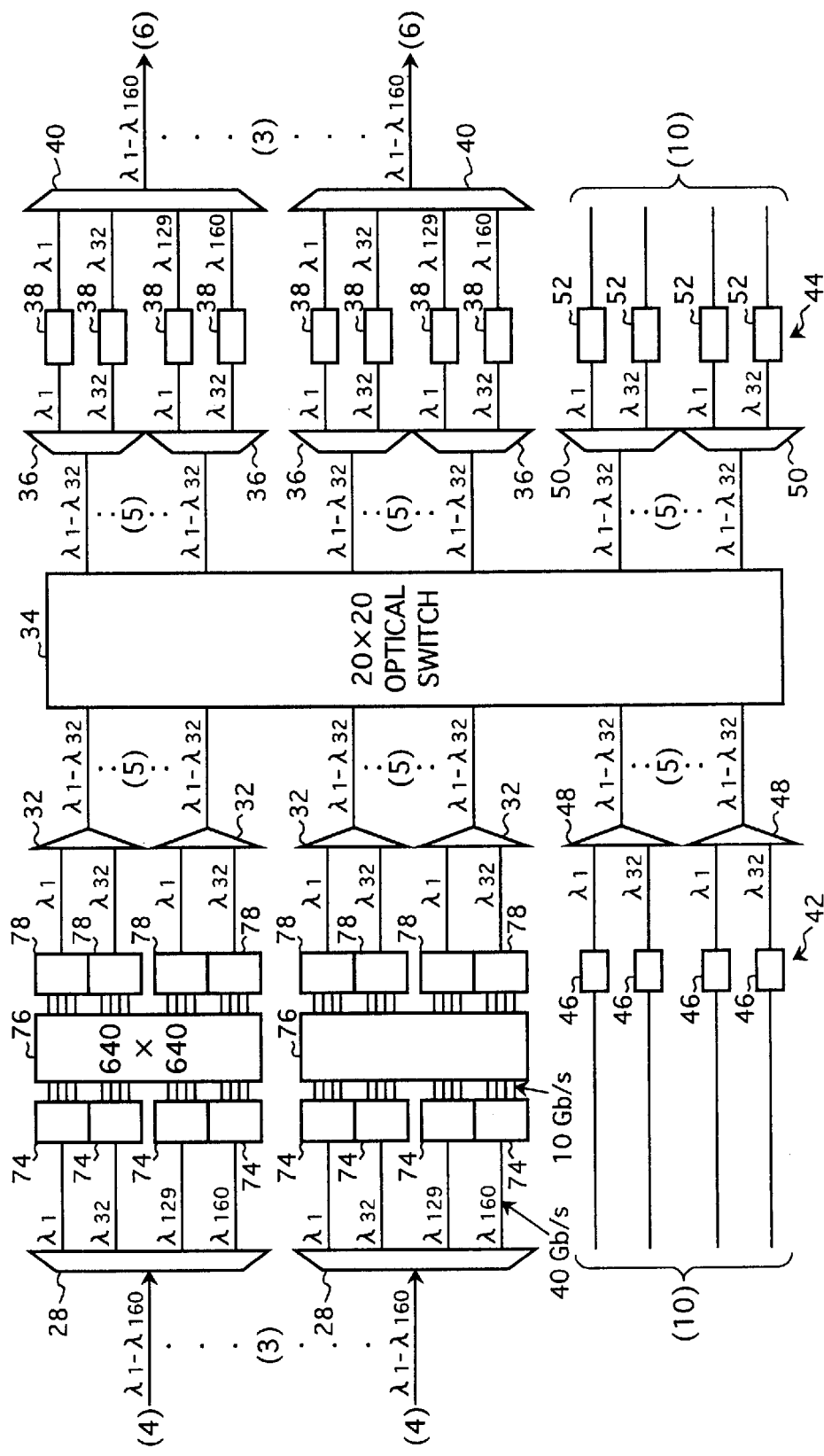
FIG. 25 is a block diagram showing a specific example of the preferred embodiment of the optical cross-connect device according to the present invention.

Referring to FIG. 25, there is shown a preferred embodiment of the optical cross-connect device according to the present invention. More specifically, there is shown a specific embodiment using the input interface shown in FIG. 16 in the optical cross-connect device shown in FIG. 8.

Figure 26:
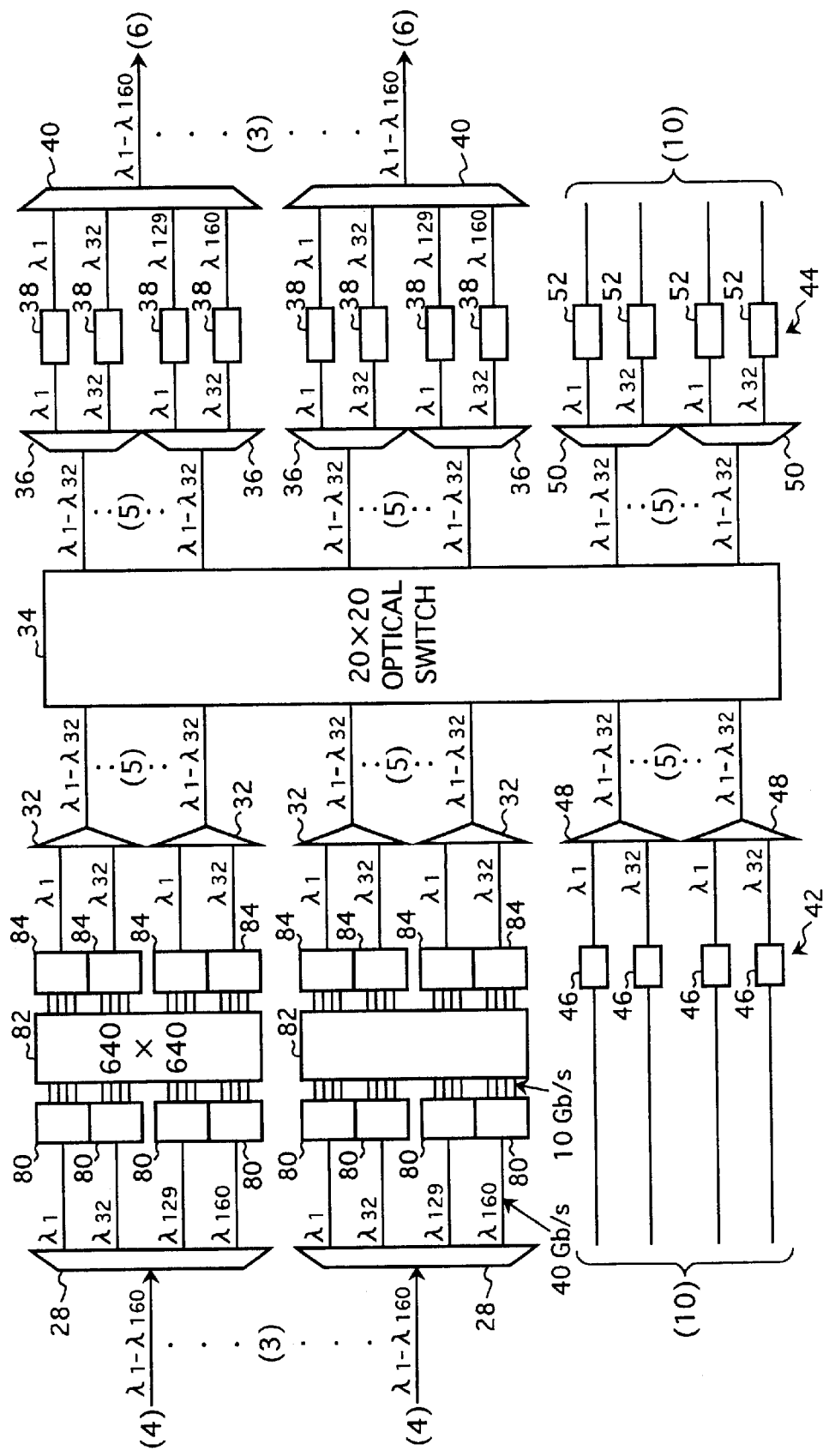
FIG. 26 is a block diagram showing a specific example of the preferred embodiment of the optical cross-connect device according to the present invention.

Referring to FIG. 26, there is shown a preferred embodiment of the optical cross-connect device according to the present invention. More specifically, there is shown a specific embodiment using the input interface shown in FIG. 19 in the optical cross-connect device shown in FIG. 8.

Figure 27:
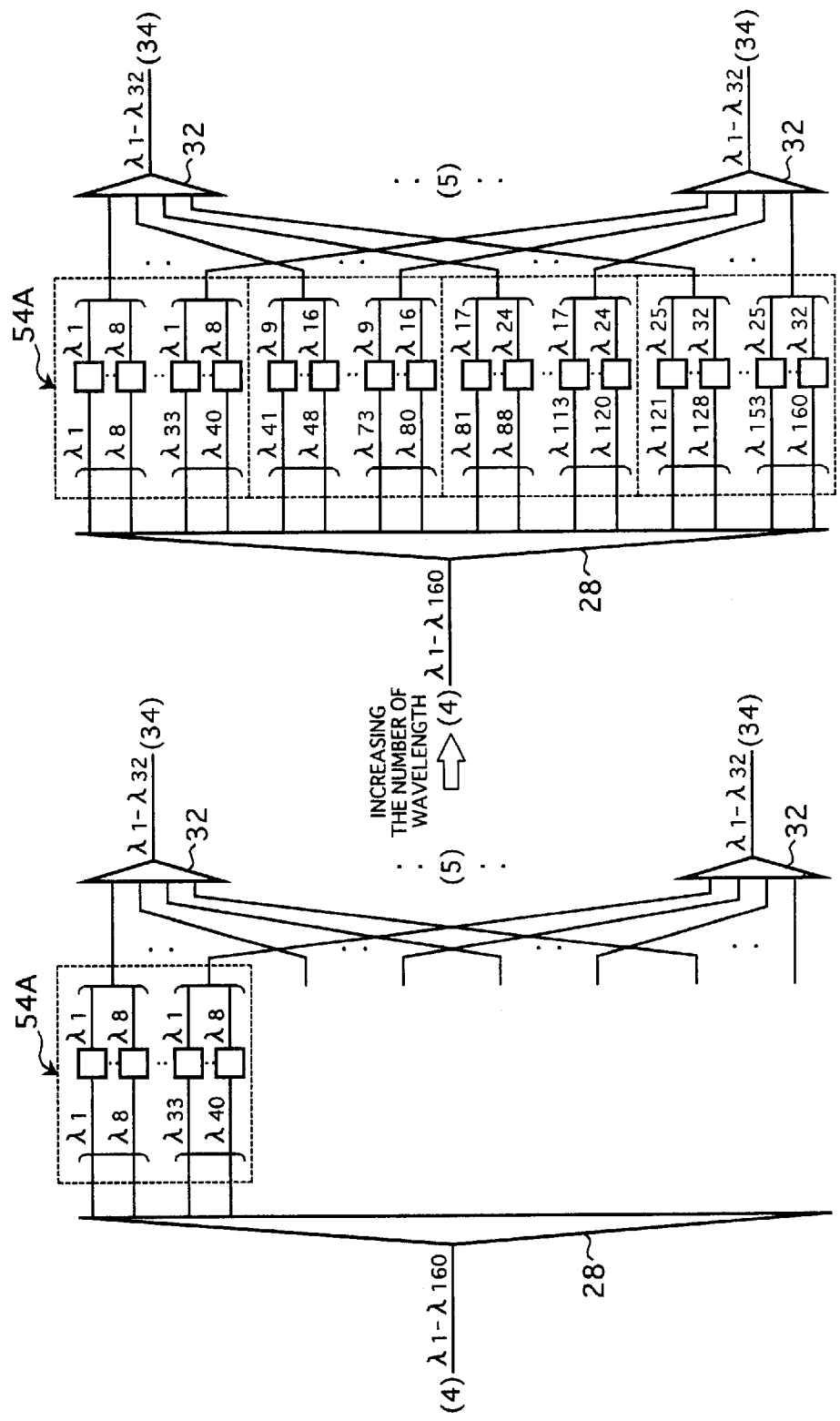
FIG. 27 is a block diagram for illustrating a specific example of the preferred embodiment of the input interface designed to have extensibility to wavelength in the optical cross-connect device according to the present invention.

FIG. 27 is a block diagram of an input interface designed to have extensibility to wavelength in the optical cross-connect device according to the present invention. More specifically, there is shown a specific example of the preferred embodiment shown in FIG. 10. In this example, a=8, that is, the extension unit 54A is designed to process 5 wavelength groups each having 8 wavelengths.

Figure 28:
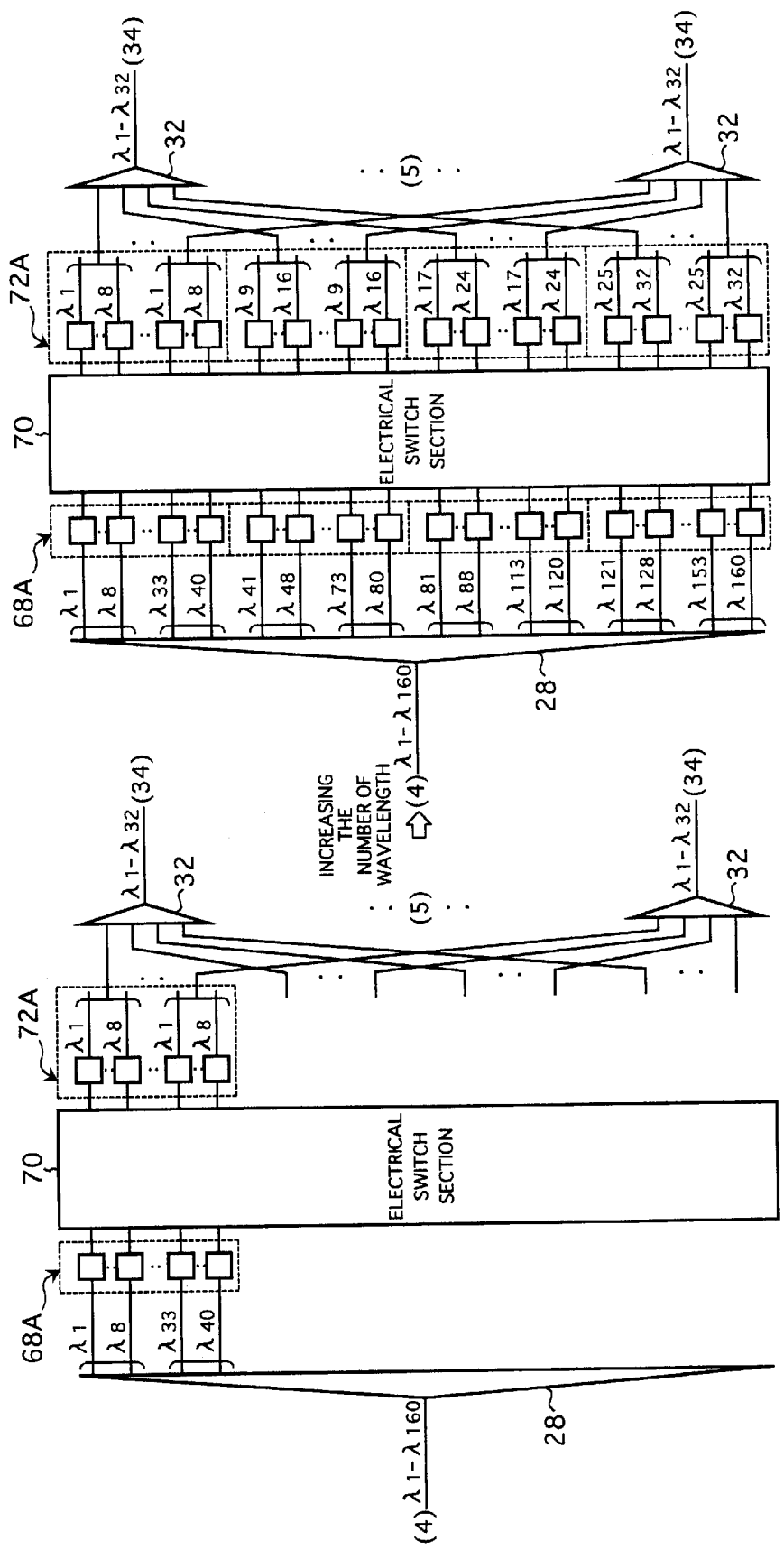
FIG. 28 is a block diagram for illustrating a specific example of the preferred embodiment of the input interface designed to have extensibility to wavelength in the optical cross-connect device according to the present invention.

FIG. 28 is a block diagram showing an input interface designed to have extensibility to wavelength in the optical cross-connect device according to the present invention. More specifically, there is shown a specific example of the preferred embodiment shown in FIG. 15. In this example, a=8, that is, each of the extension units 68A and 72A is designed to process 5 wavelength groups each having 8 wavelengths. An optical receiver may be used as each component of the extension unit 68A, and an optical transmitter may be used as each component of the extension unit 72A. A 3R transponder may be used instead of each of the optical receiver and the optical transmitter, and an optical switch section may be used instead of the electrical switch section 70.

Figure 29:
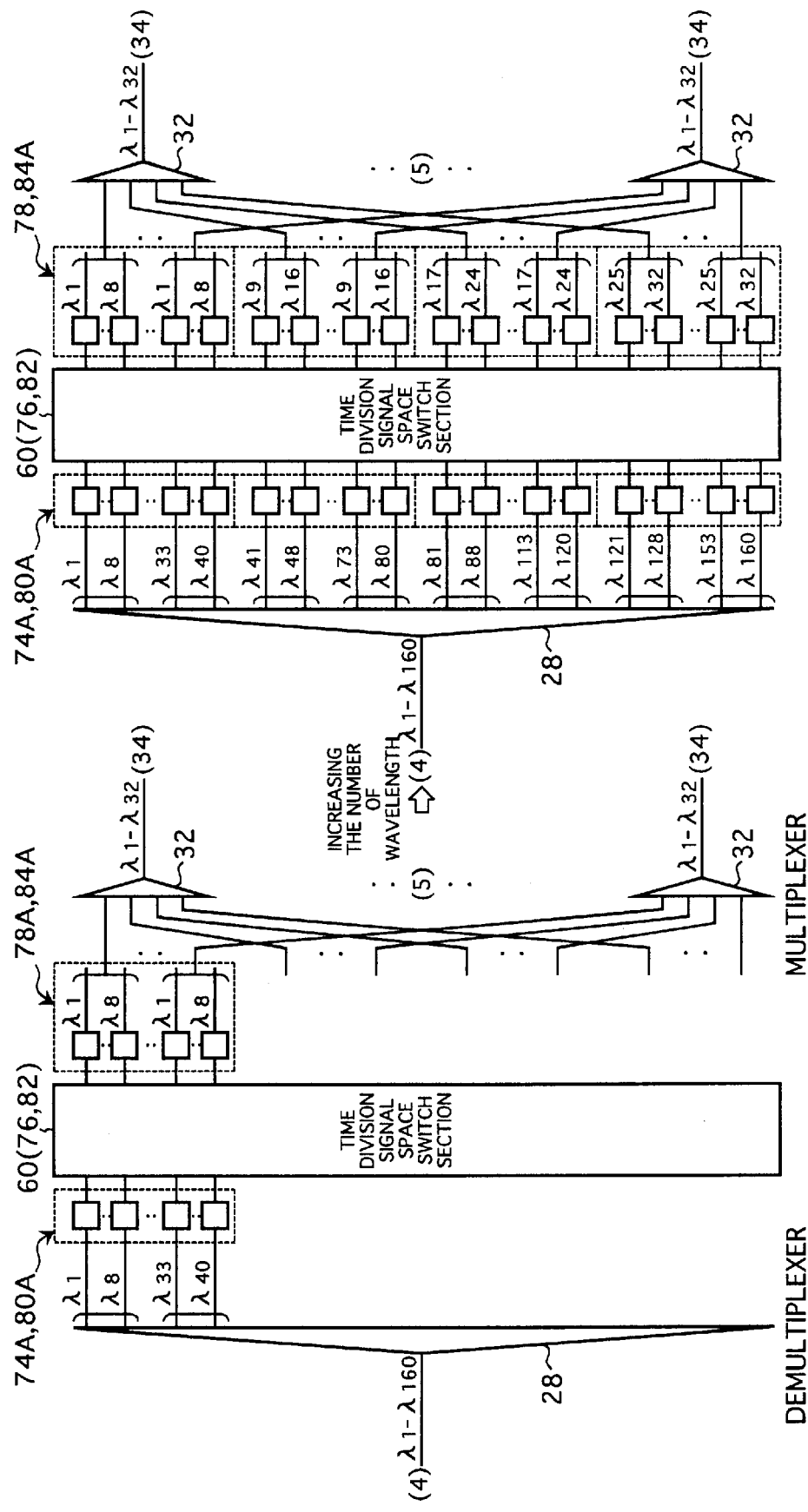
FIG. 29 is a block diagram for illustrating a specific example of the preferred embodiment of the input interface designed to have extensibility to wavelength in the optical cross-connect device according to the present invention.

FIG. 29 is a block diagram showing an input interface designed to have extensibility to wavelength in the optical cross-connect device according to the present invention. More specifically, there is shown a specific example of the preferred embodiment shown in FIG. 18 or 20. In this example, a=8, that is, the extension unit is designed to process 5 wavelength groups each having 8 wavelengths. In the preferred embodiment shown in FIG. 18, the time division signal space switch section 60 corresponds to the electrical switch section 76, and in the preferred embodiment shown in FIG. 20, the time division signal space switch section 60 corresponds to the optical switch section 82.

Figure 30:
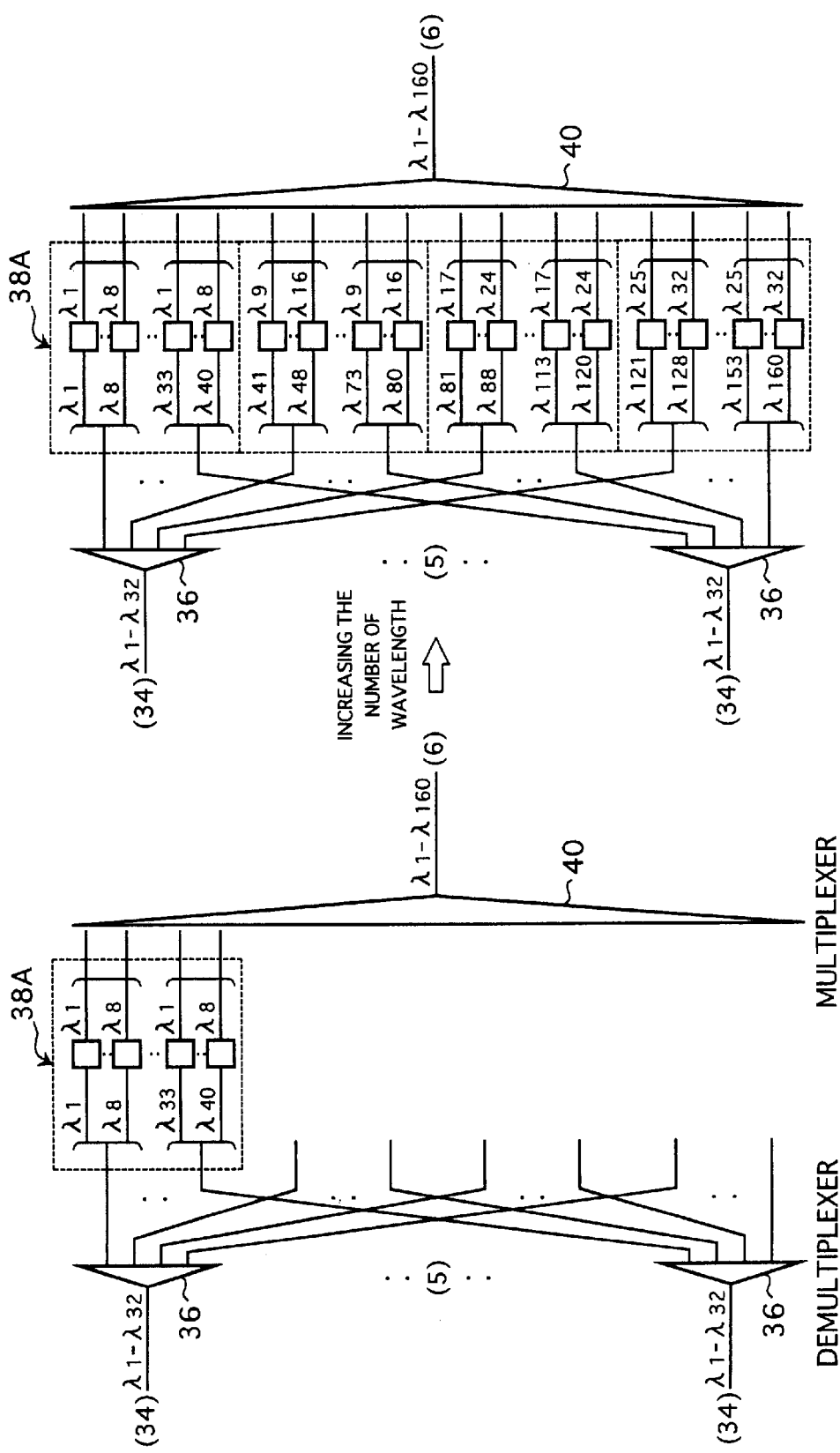
FIG. 30 is a block diagram for illustrating a specific example of the preferred embodiment of the output interface designed to have extensibility to wavelength in the optical cross-connect device according to the present invention.

Referring to FIG. 30, there is shown a block diagram of an output interface designed to have extensibility to wavelength in the optical cross-connect device according to the present invention. More specifically, there is shown a specific example of the output interface in the preferred embodiment shown in FIG. 9. In this example, a=8, that is, the extension unit 38A is designed to process 5 wavelength groups each having 8 wavelengths.

Figure 31:
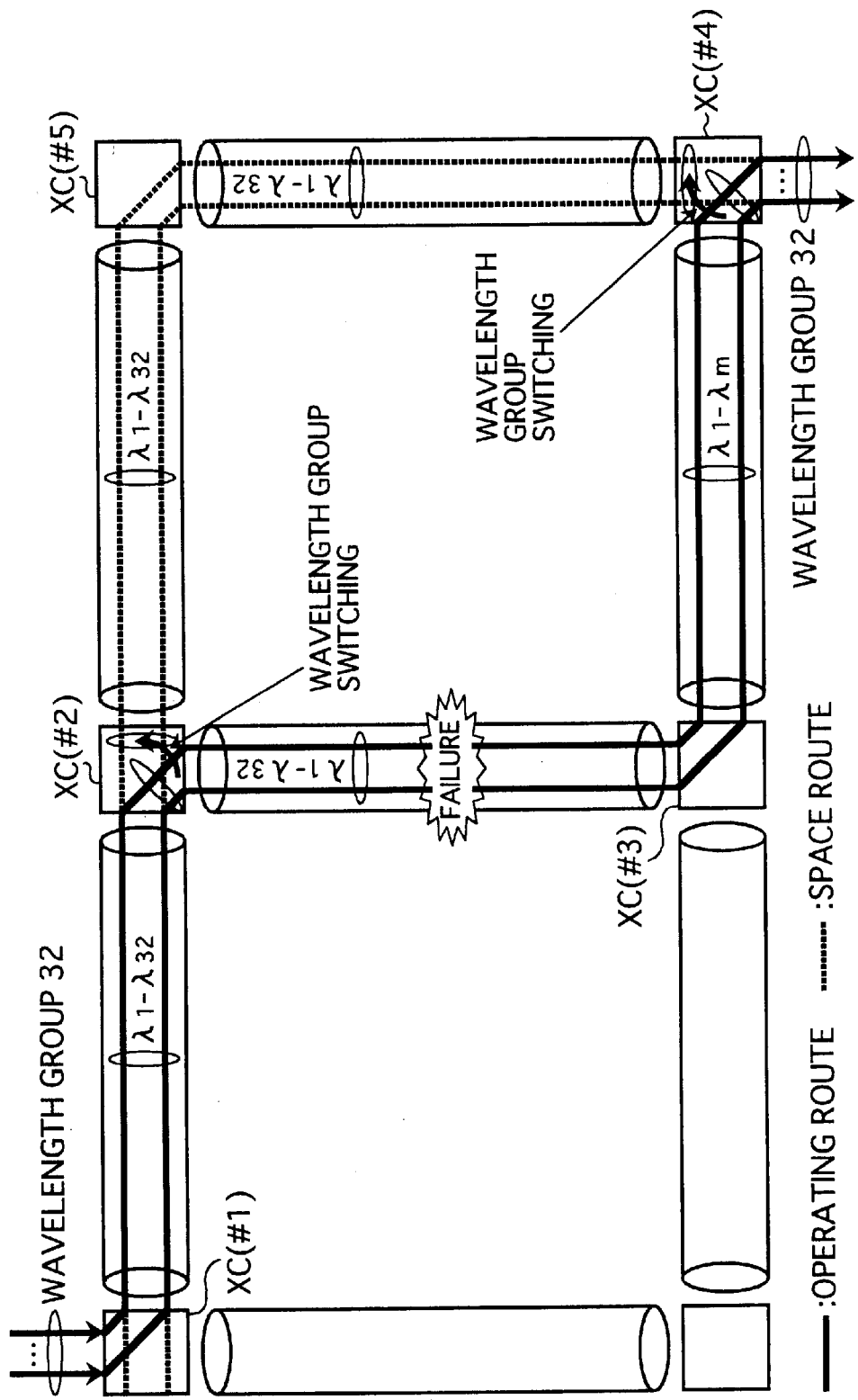
FIG. 31 is a schematic diagram for illustrating failure restoration in a preferred embodiment of the system according to the present invention.

FIG. 31 is a schematic diagram for illustrating failure restoration in the system according to the present invention. More specifically, there is shown a specific example of the preferred embodiment shown in FIG. 21. In this example, m=32, that is, the wavelength group has 32 wavelengths. The operation of this example is the same as that of the preferred embodiment shown in FIG. 21.

Figure 32:
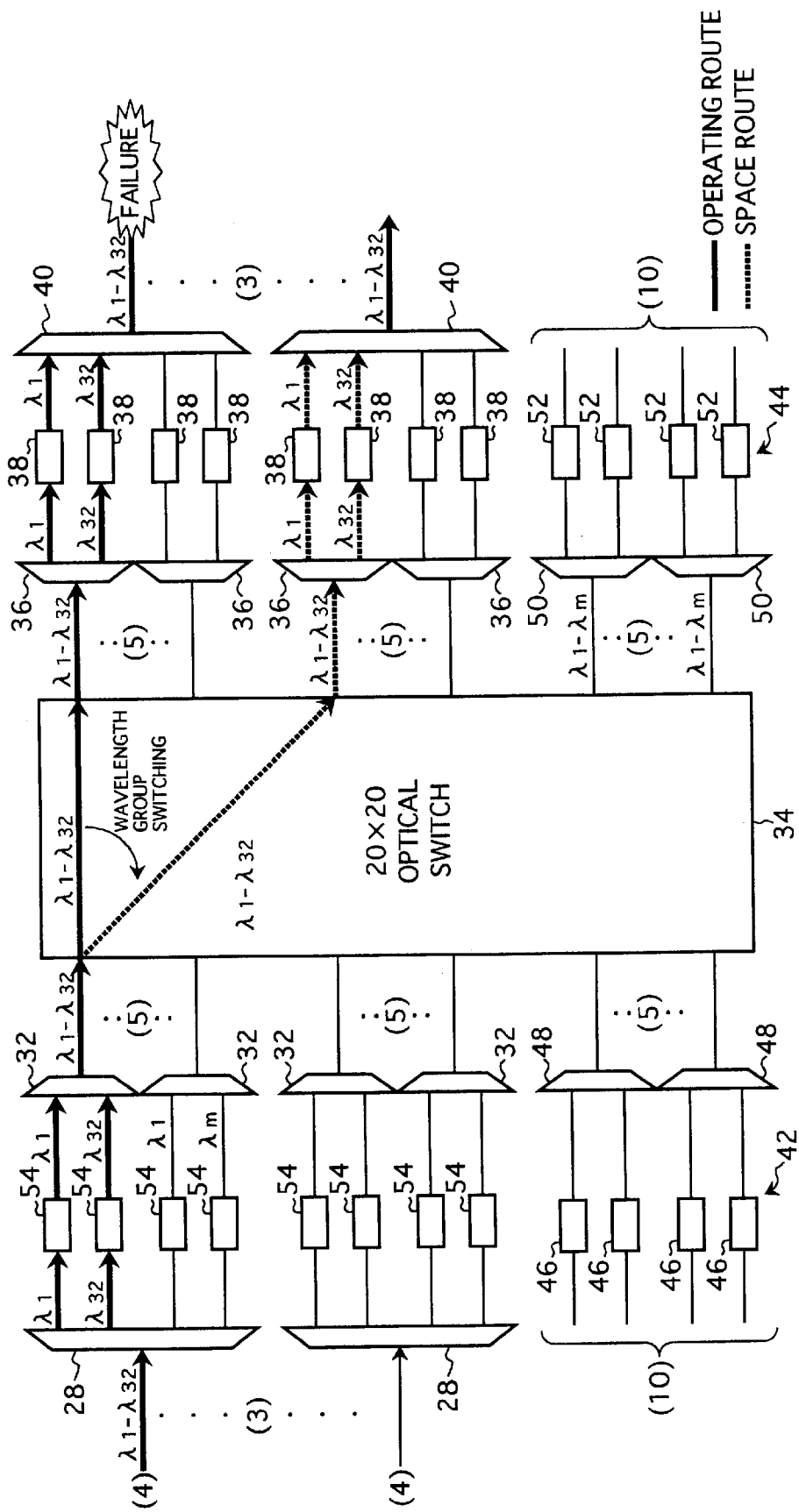
FIG. 32 is a block diagram showing a preferred embodiment of the optical cross-connect device applicable to the system shown in FIG. 31.

FIG. 32 is a block diagram for illustrating the operation of the optical cross-connect device in the case of failure restoration as described in FIG. 31. More specifically, the optical cross-connect device shown in FIG. 22 is shown in FIG. 32, and the operation of the optical cross-connect device XC(#2) shown in FIG. 31 is shown. The optical cross-connect device XC(#2) is required to output a wavelength group so as to bypass an optical transmission line in which a failure occurs, so that the optical switch (routing section) 34 operates to output the wavelength group from a different output port.

Figure 33:
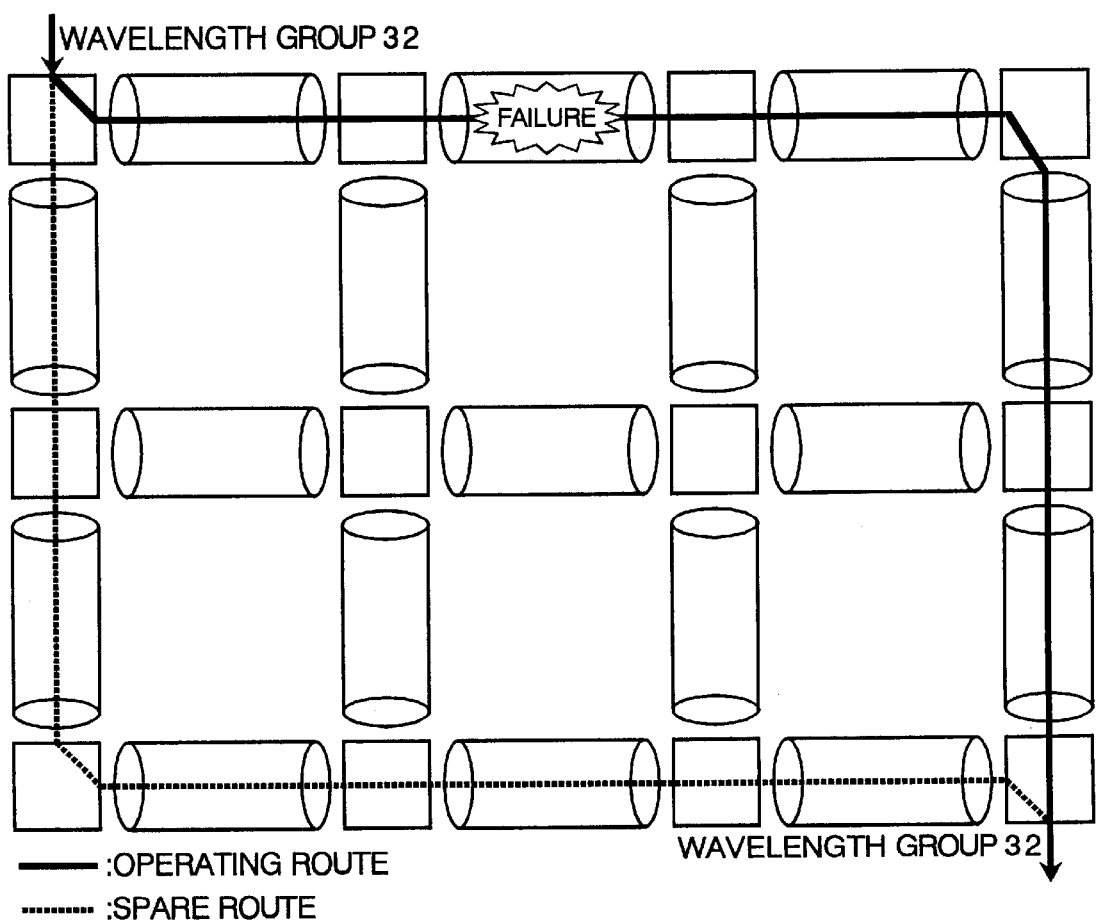
FIG. 33 is a schematic diagram for illustrating an example of route switching in the case of transmission line failure in a preferred embodiment of the system according to the present invention.
Figure 34:
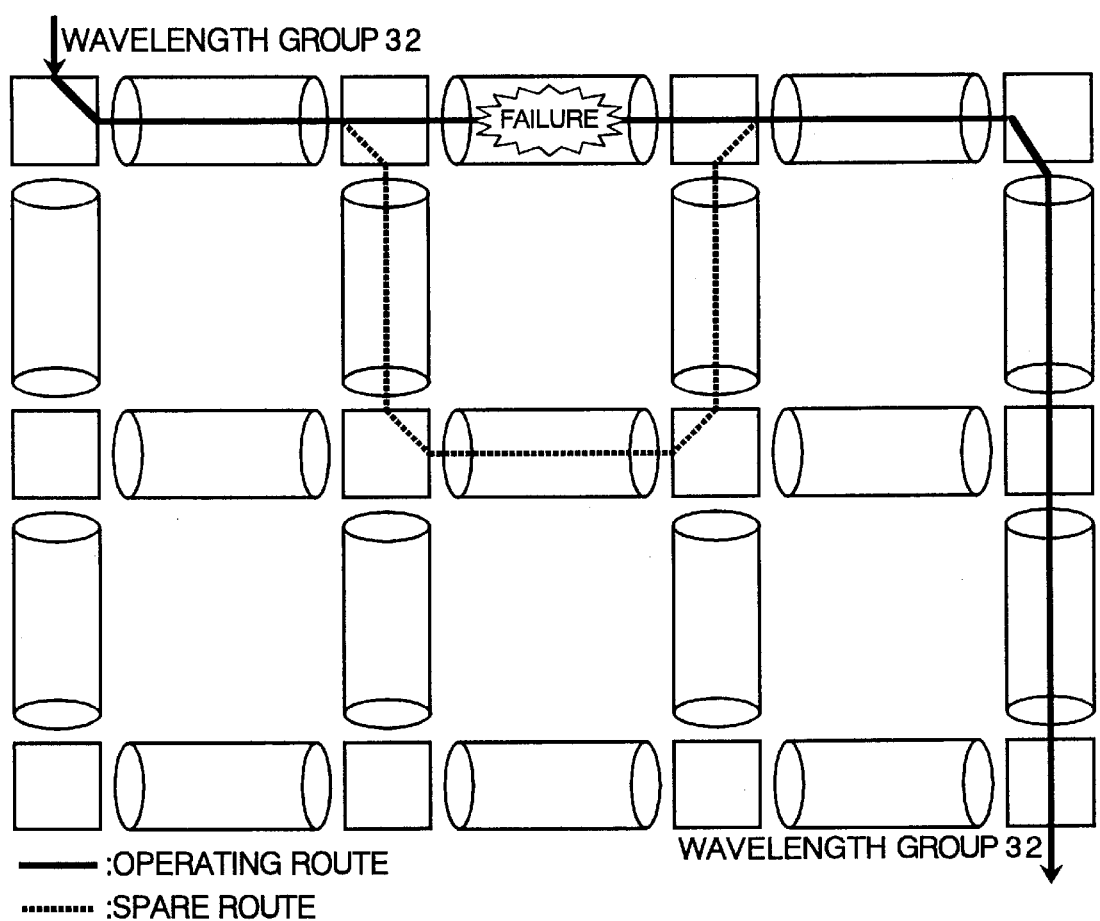
FIG. 34 is a schematic diagram for illustrating another example of route switching in the case of transmission line failure in a preferred embodiment of the system according to the present invention.

FIGS. 33 and 34 are schematic diagrams for illustrating path switching in the system according to the present invention. In FIGS. 33 and 34, the rectangles represent nodes (optical cross-connect devices), and any adjacent ones of the nodes are connected by an optical transmission line. In the preferred embodiment shown in FIG. 33, when a failure occurs in some optical transmission line, the operating optical path is wholly switched to another different route between the two nodes to be set. On the other hand, in the preferred embodiment shown in FIG. 34, when a failure occurs in some optical transmission line, the operating optical path is partially switched to another different route between the nodes present at the opposite ends of this optical transmission line.

Figure 35:
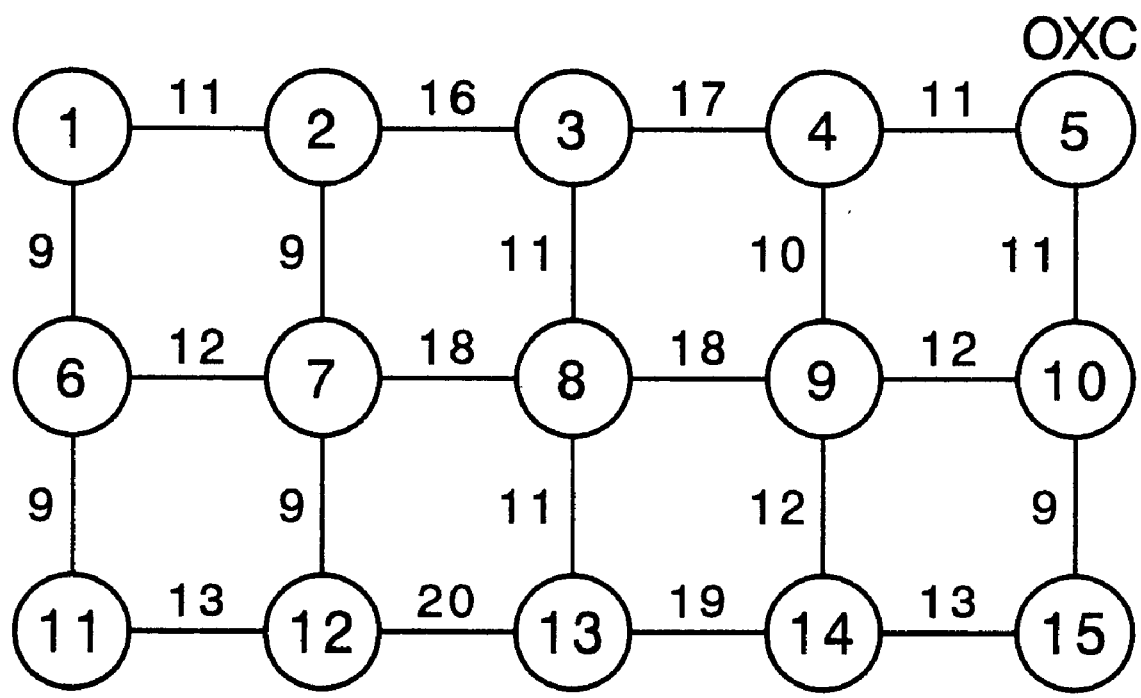
FIG. 35 is a block diagram showing a full-mesh linked network employing 15 optical cross-connect devices.

Referring to FIG. 35, there is shown a preferred embodiment of the system according to the present invention. This system is configured as a 3×5 lattice network including 15 optical cross-connect devices linked by paths in a full-mesh fashion. In FIG. 35, each circle represents an optical cross-connect device, and the numeral inside each circle represents the number assigned to the optical cross-connect device. Further, the straight line connecting the neighboring optical cross-connect devices represents an optical transmission line, and the numeral attached to each straight line represents the number of wavelengths required.

Figure 36:
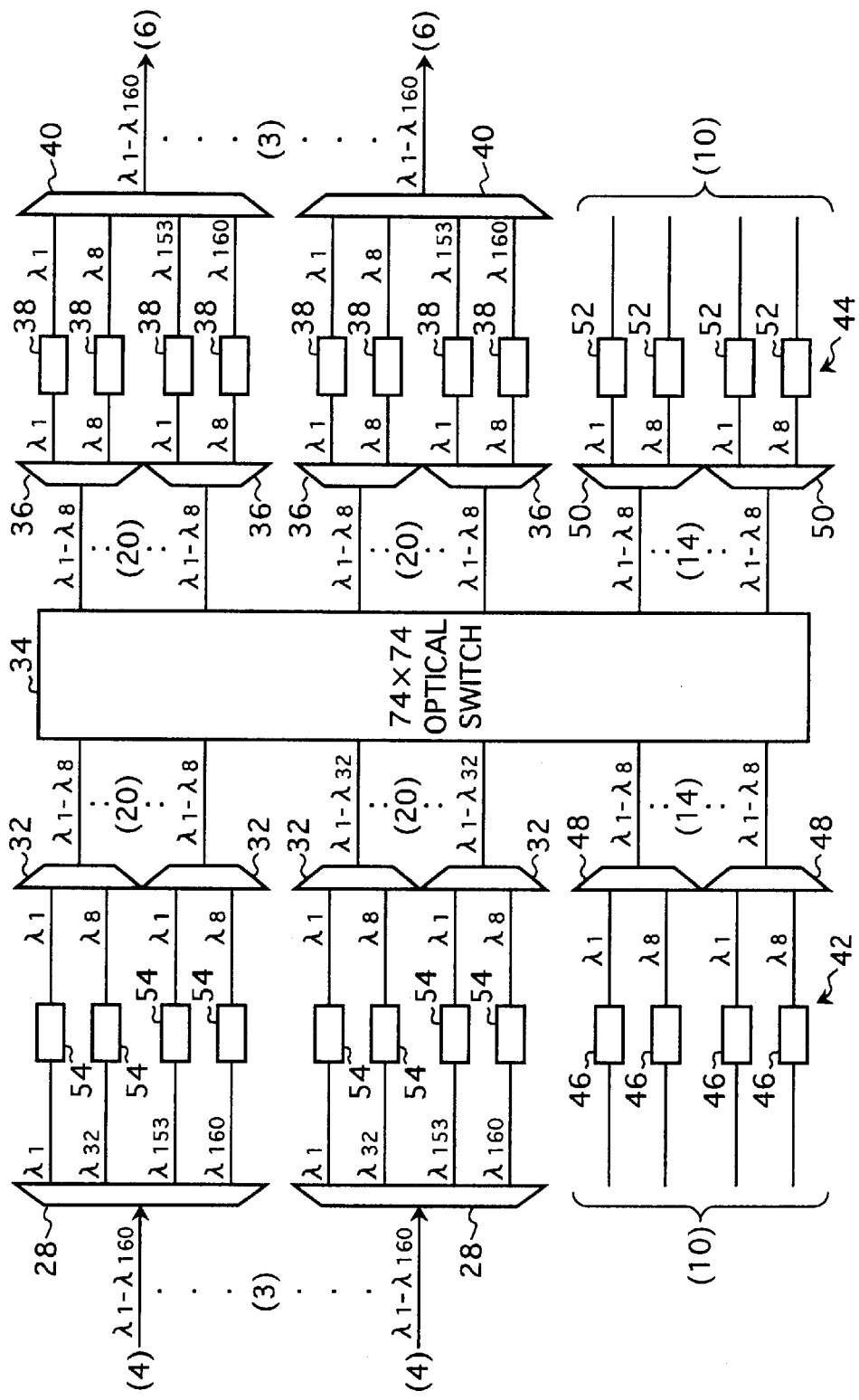
FIG. 36 is a block diagram showing a preferred embodiment of the optical cross-connect device applicable to the network shown in FIG. 35.

When the traffic increases by m times, the number of wavelengths attached to each optical transmission line is also increased by m times. Accordingly, in the case of m=8, the 13-th node (optical cross-connect device), for example, is configured as shown in FIG. 36 wherein the number of input and output transmission lines is 3 for each, the number of wavelengths is 160, and the number of intra-office channels is 112 (=8×14). The optical cross-connect device shown in FIG. 36 is one applicable to the system shown in FIG. 35, and corresponds to the preferred embodiment shown in FIG. 22.

Referring to FIG. 37, there is shown a result of comparison in required number of elements of an optical switch as the routing section between the prior art and the present invention as a table. In the case of obtaining the same function as that of the optical cross-connect device shown in FIG. 36 by using a prior art optical cross-connect device designed to perform wavelength routing by the wavelength, the required number of elements of a 2×2 optical switch becomes 350464 (=592×592). To the contrary, in the optical cross-connect device according to the present invention, wavelength routing is performed by the wavelength group, so that the required number of elements can be reduced to 5476 (=74×74), thus allowing a substantial reduction in size of a required optical switch.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical cross-connect device comprising:

k (k is an integer satisfying 1≦k) first wavelength demultiplexing sections each for receiving WDM signal light obtained by wavelength division multiplexing n (n is an integer satisfying 1≦n) optical signals having different wavelengths to demultiplex said WDM signal light into said n optical signals;

k wavelength group generating sections each for receiving said n optical signals output from each first wavelength demultiplexing section to generate i (i is an integer satisfying n=im where m is an integer satisfying 1≦m) wavelength groups each having m wavelengths;

ik first wavelength multiplexing sections each for receiving each wavelength group output from each wavelength group generating section to multiplex the wavelengths of each wavelength group and then output a resultant WDM wavelength group;

a routing section having at least ik input ports and ik output ports for routing said WDM wavelength groups between said input ports and said output ports; ik second wavelength demultiplexing sections each for receiving said WDM wavelength group output from each output port of said routing section to output a wavelength group having m wavelengths;

kn wavelength converting sections each for performing wavelength conversion of each optical signal in said wavelength group output from each second wavelength demultiplexing section so as to correspond to said WDM signal light; and k second wavelength multiplexing sections each for receiving n optical signals output from said wavelength converting sections to wavelength division multiplex said n optical signals and then output resultant WDM signal light.

2. An optical cross-connect device according to claim 1, further comprising an input link and an output link for connecting said routing section to another communication device.

3. An optical cross-connect device according to claim 1, wherein each wavelength group generating section comprises n wavelength converting sections.

4. An optical cross-connect device according to claim 1, wherein each wavelength group generating section comprises a wavelength switch section for outputting each of said n optical signals output from each first wavelength demultiplexing section to an arbitrary input port of each first wavelength multiplexing section.

5. An optical cross-connect device according to claim 1, wherein each wavelength group generating section comprises n time division signal demultiplexing sections each for demultiplexing each of said n optical signals output from each first wavelength demultiplexing section into lower-speed time division multiplexed signals, a time division signal space switch section for switching said lower-speed time division multiplexed signals, and n time division signal multiplexing sections for generating said i wavelength groups according to outputs from said time division signal space switch section.

6. An optical cross-connect device according to claim 4, wherein said wavelength switch section comprises n opto/electric converting sections for receiving said n optical signals output from each first wavelength demultiplexing section, an n×n electrical switch section for receiving outputs from said opto/electric converting sections, and n electro/optic converting sections for receiving outputs from said electrical switch section.

7. A system having a plurality of optical cross-connect devices connected by optical transmission lines, at least one of said optical cross-connect devices comprising:

k (k is an integer satisfying 1≦k) first wavelength demultiplexing sections each for receiving WDM signal light obtained by wavelength division multiplexing n (n is an integer satisfying 1≦n) optical signals having different wavelengths to demultiplex said WDM signal light into said n optical signals;

k wavelength group generating sections each for receiving said n optical signals output from each first wavelength demultiplexing section to generate i (i is an integer satisfying n=im where m is an integer satisfying 1≦m) wavelength groups each having m wavelengths;

ik first wavelength multiplexing sections each for receiving each wavelength group output from each wavelength group generating section to multiplex the wavelengths of each wavelength group and then output a resultant WDM wavelength group;

a routing section having at least ik input ports and ik output ports for routing said WDM wavelength groups between said input ports and said output ports;

ik second wavelength demultiplexing sections each for receiving said WDM wavelength group output from each output port of said routing section to output a wavelength group having m wavelengths;

kn wavelength converting sections each for performing wavelength conversion of each optical signal in said wavelength group output from each second wavelength demultiplexing section so as to correspond to said WDM signal light; and k second wavelength multiplexing sections each for receiving n optical signals output from said wavelength converting sections to wavelength division multiplex said n optical signals and then output resultant WDM signal light.

* * * * *